US012759223B2

(12) United States Patent
Oxman et al.

(10) Patent No.: US 12,759,223 B2
(45) Date of Patent: Oct. 13, 2026

(54) ADDITIVE MANUFACTURING SYSTEM AND METHOD

(71) Applicant: NEOX Public Benefit LLC, New York, NY (US)

(72) Inventors: Neri Oxman, New York, NY (US); Markus A.R. Kayser, New York, NY (US); David Franck, Brooklyn, NY (US); Florian Born, New York, NY (US)

(73) Assignee: NEOX Public Benefit LLC, New York, NY (US)

( * ) Notice: Subject to any disclaimer, the term of this patent is extended or adjusted under 35 U.S.C. 154(b) by 0 days.

(21) Appl. No.: 18/912,928

(22) Filed: Oct. 11, 2024

(65) Prior Publication Data

US 2025/0121557 A1 Apr. 17, 2025

Related U.S. Application Data

(60) Provisional application No. 63/698,751, filed on Sep. 25, 2024, provisional application No. 63/589,747, filed on Oct. 12, 2023, provisional application No. 63/589,723, filed on Oct. 12, 2023.

(51) Int. Cl.

*B29C 64/245* (2017.01)
*B29C 64/118* (2017.01)

(Continued)

(52) U.S. Cl.

CPC .......... *B29C 64/118* (2017.08); *B29C 64/209* (2017.08); *B29C 64/241* (2017.08);

(Continued)

(58) Field of Classification Search

CPC .... B29C 64/118; B29C 64/209; B29C 64/241

See application file for complete search history.

(56) References Cited

U.S. PATENT DOCUMENTS

| | | | |
|---|---|---|---|
| 10,426,230 | B2 | 10/2019 | Manz et al. |
| 10,485,301 | B2 | 11/2019 | Bohnsack et al. |

(Continued)

FOREIGN PATENT DOCUMENTS

| | | | | | |
|---|---|---|---|---|---|
| CN | 106267341 | A | * | 1/2017 | ............ A61L 27/26 |
| JP | 2020131700 | A | * | 8/2020 | ........... B29C 64/393 |
| WO | WO 2024/133187 | A1 | | 6/2024 | |

*Primary Examiner* — Susan D Leong
*Assistant Examiner* — Vipul Malik
(74) *Attorney, Agent, or Firm* — DORITY & MANNING, P.A.

(57) ABSTRACT

An additive manufacturing system is described herein that includes an articulation system. The articulation system may include an actuator assembly, a base operably coupled with the actuator assembly, and an arm rotatable relative to the base. An end-piece may be operably coupled with a distal end portion of the arm. The end-piece may be rotatable relative to the arm. A print system may be configured to extrude an additive material towards the end-piece. A computing system may be configured to receive an input related to a defined design of an article, determine an end-piece path through actuation of the articulation system based on the defined design, and control the print system and the articulation system to extrude the additive material from the print system during the first additive process, wherein the first additive process comprises extruding multiple filaments of additive material simultaneously through the first nozzle.

26 Claims, 25 Drawing Sheets

(51) Int. Cl.

| | |
|---|---|
| ***B29C 64/209*** | (2017.01) |
| ***B29C 64/241*** | (2017.01) |
| ***B29C 64/386*** | (2017.01) |
| ***B29K 67/00*** | (2006.01) |
| ***B29L 31/50*** | (2006.01) |
| ***B33Y 10/00*** | (2015.01) |
| ***B33Y 30/00*** | (2015.01) |
| ***B33Y 50/00*** | (2015.01) |
| *B33Y 80/00* | (2015.01) |

(52) U.S. Cl.

CPC ............ *B29C 64/245* (2017.08); *B33Y 10/00* (2014.12); *B33Y 30/00* (2014.12); *B29C 64/386* (2017.08); *B29K 2067/04* (2013.01); *B29K 2995/006* (2013.01); *B29L 2031/50* (2013.01); *B33Y 50/00* (2014.12); *B33Y 80/00* (2014.12)

(56) References Cited

U.S. PATENT DOCUMENTS

| | | | | |
|---|---|---|---|---|
| 10,793,983 | B2 | 10/2020 | Gladish et al. | |
| 11,497,275 | B2 | 11/2022 | Busbee et al. | |
| 2014/0197576 | A1* | 7/2014 | Kraibuhler ............. | B33Y 10/00 425/375 |
| 2017/0129172 | A1* | 5/2017 | Waatti ................... | B29C 64/236 |
| 2017/0173868 | A1* | 6/2017 | Mark .................... | B29C 64/118 |
| 2017/0202309 | A1* | 7/2017 | Sterman ................. | B33Y 10/00 |
| 2018/0036946 | A1 | 2/2018 | Barton et al. | |
| 2018/0147752 | A1 | 5/2018 | Nürnberg et al. | |
| 2018/0326658 | A1* | 11/2018 | Saito ....................... | B29C 64/20 |
| 2018/0339445 | A1* | 11/2018 | Loveder ............. | A43B 23/0245 |
| 2019/0030805 | A1* | 1/2019 | Mantell .................. | B33Y 10/00 |
| 2021/0315322 | A1 | 10/2021 | Tanabe et al. | |
| 2022/0110413 | A1 | 4/2022 | Che et al. | |
| 2024/0351277 | A1* | 10/2024 | Karklinsh ............. | B29C 64/209 |

* cited by examiner

ADDITIVE MANUFACTURING SYSTEM AND METHOD

CROSS-REFERENCE TO RELATED APPLICATION

This application claims priority to U.S. Provisional Patent Application No. 63/698,751, filed Sep. 25, 2024, and entitled "ADDITIVE MANUFACTURING SYSTEM AND METHOD", U.S. Provisional Patent Application No. 63/589,747, filed Oct. 12, 2023, and entitled "SYSTEM AND METHOD FOR SHOE MANUFACTURING", and U.S. Provisional Patent Application No. 63/589,723, filed Oct. 12, 2023, and entitled "BIODEGRADABLE MONOFILAMENT AND METHOD FOR PRODUCING THE SAME", the contents of each are hereby expressly incorporated herein by reference in their entirety.

FIELD

The present subject matter relates generally to an additive manufacturing system, and more particularly to an additive manufacturing system that can form various components.

BACKGROUND

Various components, such as footwear, may be formed through different manufacturing processes that generally include adhering or otherwise attaching various materials to one another. The different manufacturing processes may be relatively laborious and time-consuming.

SUMMARY

Aspects and advantages of embodiments of the present disclosure will be set forth in part in the following description or can be learned from the description, or can be learned through practice of the embodiments.

Example aspects of the present disclosure provide an example additive manufacturing system that may include an articulation system. The articulation system may include an actuator assembly, a base operably coupled with the actuator assembly, and an arm rotatable relative to the base. An end-piece may be operably coupled with a distal end portion of the arm. The end-piece may be rotatable relative to the arm. The end-piece may define a shoe last. A print system may be configured to extrude an additive material towards the end-piece. The print system may include a first nozzle having a plurality of orifices. A computing system may include one or more processors and one or more non-transitory computer-readable media that collectively store instructions that, when executed by the one or more processors, configure the computing system to receive an input related to a defined design of an article, determine an end-piece path through actuation of the articulation system based on the defined design, and control the print system and the articulation system to extrude the additive material from the print system during a first additive process. The first additive process may include extruding multiple filaments of the additive material simultaneously through the first nozzle.

In some instances, the multiple filaments of the additive material may be disposed on one another during a common pass of the end-piece along the first nozzle to define gaps between the multiple filaments.

In some instances, the print system may further include a blower configured to blow the additive material toward a defined location.

In some instances, the print system may further include a second nozzle having a plurality of orifices. The first nozzle and the second nozzle may be directed towards a common defined location.

In some instances, the print system may further include a probe configured to capture data indicative of a position of the first nozzle relative to the end-piece.

In some instances, the first nozzle and the probe may be movable with one another along a Z-axis.

In some instances, a compressor unit may be positioned within a working envelope of the articulation system. The compressor unit may be configured to alter a characteristic of the article based on contact between the compressor unit and the article.

In some instances, the actuator assembly may further include a first actuator configured to translate the base along an X-axis direction.

In some instances, the actuator assembly may further include a second actuator configured to translate the first actuator and the base along a Y-axis direction.

In some instances, the actuator assembly may further include a first torsion joint configured to allow rotational movement between the base and the arm.

In some instances, the actuator assembly may further include a second torsion joint configured to allow rotational movement between the arm and the end-piece.

In some instances, the additive material may include biodegradable or bio-derived content.

In some instances, the additive material may include a polyhydroxyalkanoate (PHA) or a blend thereof.

In some instances, the additive material may include a polyhydroxybutyrate (PHBV) or a blend thereof.

In some instances, the additive material may include a poly(3-hydroxybutyrate-4-hydroxybutyrate) (P3HB4HB) or a blend thereof.

In some instances, the articulation system may be configured as a five-axis machine.

In some instances, the articulation system may be configured as a six-axis machine.

Example aspects of the present disclosure provide an example method for manufacturing an article. The method may include receiving, with a computing system, an input related to a defined article design. The method may also include determining, with the computing system, an end-piece path through actuation of an articulation system based on the defined design of an article. Lastly, the method may include controlling, with the computing system, a print system, and an articulation system to extrude an additive material from the print system during a first additive process. The first additive process may include extruding multiple filaments of additive material simultaneously through a first nozzle.

In some instances, extruding multiple filaments of the additive material simultaneously through the first nozzle may further include disposing the multiple filaments on one another during a common pass of the end-piece along the first nozzle to define gaps between the multiple filaments.

In some instances, extruding multiple filaments of the additive material simultaneously through the first nozzle may further include disposing the multiple filaments adjacently to one another during a common pass of the end-piece along the first nozzle to define no gaps between the multiple filaments and a substrate upon which the multiple filaments are disposed.

In some instances, extruding multiple filaments of additive material simultaneously through the first nozzle may further include operating a blower configured to blow the multiple filaments towards a defined location.

In some instances, the additive material may include biodegradable or bio-derived content.

In some instances, the additive material may be a polyhydroxyalkanoate (PHA), polyhydroxybutyrate (PHBV), poly(3-hydroxybutyrate-4-hydroxybutyrate) (P3HB4HB), or a blend thereof.

Example aspects of the present disclosure provide an example additive manufacturing system that may include a print system configured to extrude an additive material towards an end-piece. The print system may include a first nozzle having a plurality of orifices. A computing system may include one or more processors and one or more non-transitory computer-readable media that collectively store instructions that, when executed by the one or more processors, configure the computing system to determine an end-piece path through actuation of an articulation system based on a defined design of an article and control the print system to extrude the additive material from the print system during a first additive process. The first additive process may include extruding multiple filaments of the additive material simultaneously through the first nozzle along a common pass of the end-piece along the first nozzle.

In some instances, an articulation system may include an actuator assembly, a base operably coupled with the actuator assembly, and an arm rotatable relative to the base, wherein the end-piece defines a form. The end-piece may be operably coupled with a distal end portion of the arm.

In some instances, the additive material includes biodegradable or bio-derived content.

In some instances, the additive material may be a polyhydroxyalkanoate (PHA), polyhydroxybutyrate (PHBV), poly(3-hydroxybutyrate-4-hydroxybutyrate) (P3HB4HB), or a blend thereof.

In some instances, the articulation system may be configured as a five-axis machine.

In some instances, the articulation system may be configured as a six-axis machine.

In some instances, the multiple filaments of the additive material are disposed on one another during a common pass of the end-piece along the first nozzle to define gaps between the multiple filaments.

In some instances, the print system may further include a blower configured to blow the additive material toward a defined location.

In some instances, the print system may further include a second nozzle having a plurality of orifices. The first nozzle and the second nozzle may be directed towards a common defined location.

Other example aspects of the present disclosure can be applied to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in, and constitute a part of this specification, illustrate implementations of the present disclosure and, together with the description, help explain the related principles.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1A:
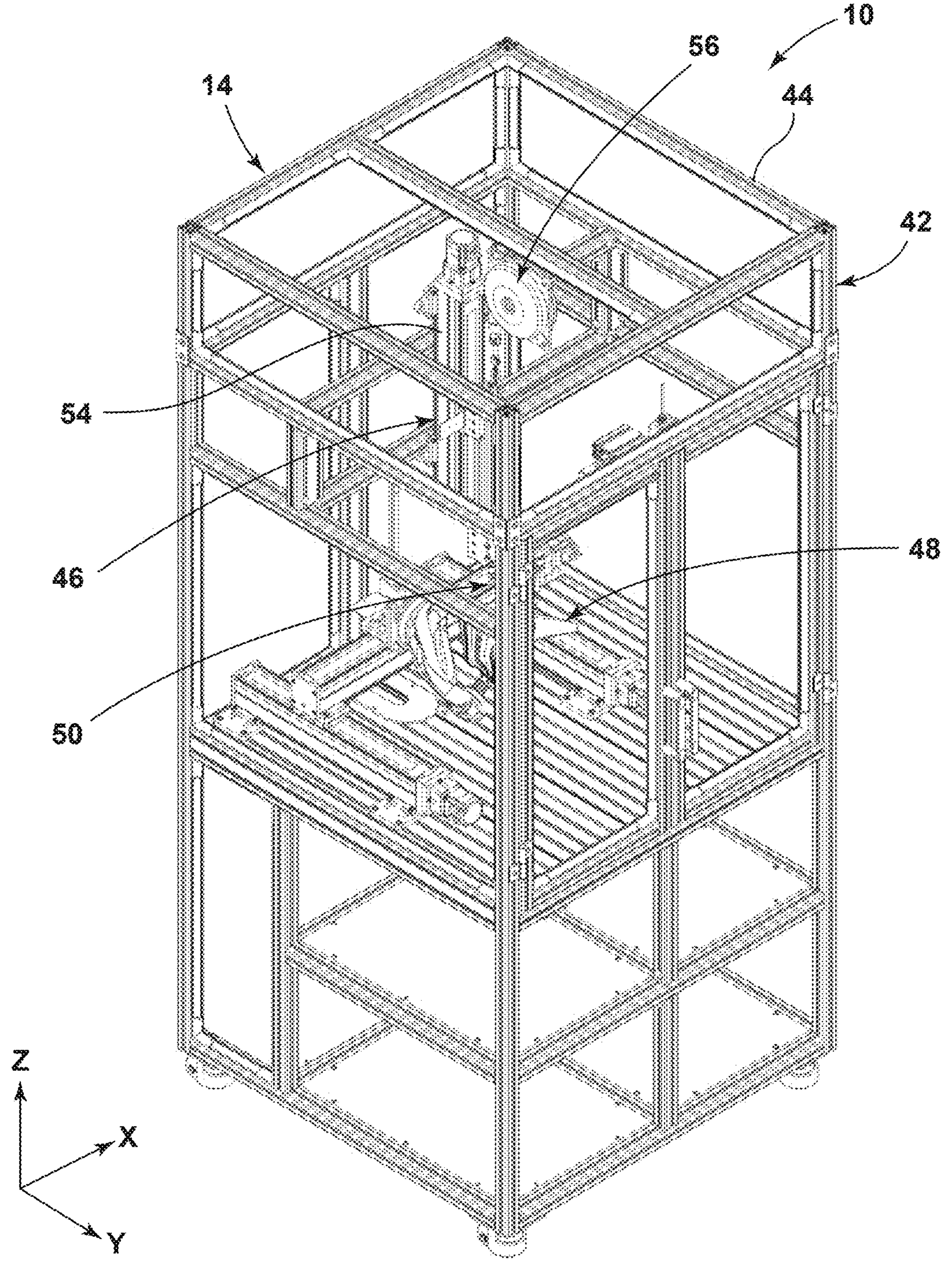
FIG. 1A is a perspective view of an additive machine according to example implementations of aspects of the present disclosure.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the disclosure, not a limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action without necessarily requiring or implying any actual relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features unless otherwise specified herein. The terms "upstream" and "downstream" refer to the relative direction with respect to a flow or movement direction of a material and/or a fluid. For example, "upstream" refers to the direction from which a material and/or a fluid flows, and "downstream" refers to the direction to which the material and/or the fluid moves. The term "selectively" refers to a component's ability to operate in various states (e.g., an ON state and an OFF state) based on manual and/or automatic control of the component. The term "radial" defines a direction that is perpendicular to an axis of rotation and the term "axial" defines a direction that is parallel to the axis of rotation.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

For the purposes of the present disclosure, the term "extrudable" refers to composition, compound, substance, material, etc., which is sufficiently malleable, pliable, thermoplastic, etc., such that it may be forced through an extrusion orifice or die.

For the purposes of the present disclosure, the term "fusible" refers to a composition, substance, material, etc., which may be fused, sintered, joined to itself, or another component, combined, etc., by the application of heat.

For the purposes of the present disclosure, the term "additive material" refers to a composition, substance, material, etc., which may be formed into a three-dimensional (3D) article, device, component, object, structure, part, etc., by a three-dimensional (3D) printing technique.

For the purposes of the present disclosure, the term "three-dimensional (3D) printing" (also known as "additive printing" and "additive manufacturing") refers to any of various processes, techniques, etc. (e.g., coating, spraying, depositing, applying, extruding, fusing, sintering, etc., or any combination thereof) for making a three-dimensional (3D) component, article, device, object, part, etc., from a three-dimensional (3D) model, other electronic data source (e.g., computer-assisted drawing (CAD) program file, stereolithographic (STL) file, etc.), etc., through additive processes in which successive sections of material (e.g., filaments, films, powders, particles, pellets, etc.) may be laid down, for example, under computer control. Three-dimensional (3D) printing processes, techniques, etc., may include, for example, fused filament fabrication (FFF), selective laser sintering (SLS) (also referred to herein interchangeably as selective laser melting (SLM)), inkjet head 3D printing (also referred to herein interchangeably as inkjet 3D printing), etc.

For the purposes of the present disclosure, the term "fused filament fabrication (FFF) (also referred to herein interchangeably as fused deposition modeling (FDM), fused extrusion deposition (FED), or Plastic Jet Printing (PJP))" refers to a three-dimensional (3D) printing technique wherein an additive material (preformed or formed in situ) is extruded from an extrusion (printing) nozzle (also referred to interchangeably as a "printing head") in sections which, due to being liquefied, molten, softened, melted, etc., adhere (fuse) together to form the three-dimensional (3D) component, article, device, object, structure, part, etc.

For the purposes of the present disclosure, the term "fused filament fabrication (FFF) printer" refers to any three-dimensional (3D) printer that operates by using a fused filament fabrication (FFF) technique.

For the purposes of the present disclosure, the term "road" refers to a continuous length of liquefied, molten, melted, or softened material that is laid down after the extrusion of the material from a fused filament fabrication (FFF) printer or additive machine. In this document, one or more filaments may describe the additive material between a print head and the article. As such, each of the filaments may be used to form roads of the article.

In general, the present disclosure is directed to an additive manufacturing system that includes an articulation system. The articulation system may include an arm having one or more bending joints and/or one or more torsion joints. Additionally or alternatively, the arm may be operably coupled with an actuator assembly. An end-piece may be operably coupled with the articulation system. In some cases, the end-piece forming a shoe last. A print system may be configured to extrude an additive material towards the end-piece. In various cases, the additive material is formed from at least a portion of biodegradable content.

A computing system may be operably coupled with the articulation system and/or the print system. In operation, the computing system may be configured to receive an input related to a defined shoe design. In turn, the computing system may be configured to determine a first additive process and a second additive process to additively manufacture the defined shoe. Additionally or alternatively, the computing system may be configured to determine an end-piece path through the actuation of the articulation system for each of the first additive process and the second additive process, control the print system and the articulation system to extrude the additive material from the print system during the first additive process. Additionally or alternatively, the computing system may be configured to control the print system and the articulation system to extrude the additive material from the print system during the second additive process. The first additive process may form a first section of the shoe and the second additive process may form a second section of the shoe. In some instances, the print system includes a first print head and a second print head each within a working envelope of the articulation system. The first print head may extrude additive material during the first additive process and the second print head may extrude additive material during the second additive process. Moreover, the first print head extrudes the additive material with a first cross-sectional diameter and the second print head extrudes the additive material with a second cross-sectional diameter. The first cross-sectional diameter may be varied from the second cross-sectional diameter.

One or more of the additive processes may be referred to as fused deposition modeling (FDM) or fused filament fabrication (FFF). In fused filament fabrication (FFF), an additive material may be supplied from a supply of such additive material to an extrusion print system. In various FFF machines, a worm-drive gear system can engage and push the additive material into and through the print system at a controlled rate. The print system may be heated to melt the additive material, with the melted additive material filament then being deposited by a print system, which forms a road of material that may then harden after extrusion from the print system and fusing to the underlying road of additive material and/or a base substrate (such as an end-piece).

While depositing the melted additive material, the print system may be moved in any direction(s) under the control of a computing system. For example, the positioning of the print system may follow a build path controlled by a computer-aided manufacturing (CAM) software program implemented within the computing system. The build path defines the pattern for how the melted additive material is deposited from the print system as the "road(s)" of material to form a given section that fuses with a road immediately above and a road immediately below to combine into a unitarily formed section of the body being printed by a particular print system. Accordingly, when the article (or portions thereof) are formed through FFF additive manufacturing, the article to be produced is thus built section by section, road by road, until a completed article has been formed. In accordance with the present disclosure, the additive machine may include multiple print systems that may simultaneously and/or consecutively extrude an individual road of additive material and the individual roads join together in a pattern that forms the article.

Various example implementations are described herein with respect to the accompanying Figures.

Referring now to FIGS. 1A-7, an additive manufacturing system 10 configured to form a variety of articles 12 is illustrated. In various instances, the additive manufacturing system 10 may be adapted for different industries, providing a versatile solution for manufacturing complex, customized products. In various cases, the additive manufacturing system 10 provided herein may allow for quick adaptation to design changes and customer requirements but also promote on-demand production. In some examples provided herein, the article 12 may be configured as footwear, (e.g., a shoe (FIG. 3)). However, the additive manufacturing system 10 provided herein may be used to form any other article 12, such as lighting fixtures/shades, apparel, bags, and medical products, such as casts and splints allowing for precise and custom reinforcement areas and flexible/compliant areas where suited best in accordance to injury and individual body part shape, e.g. elbow, wrist, knee, etc., and/or any other article 12.

Figure 1B:
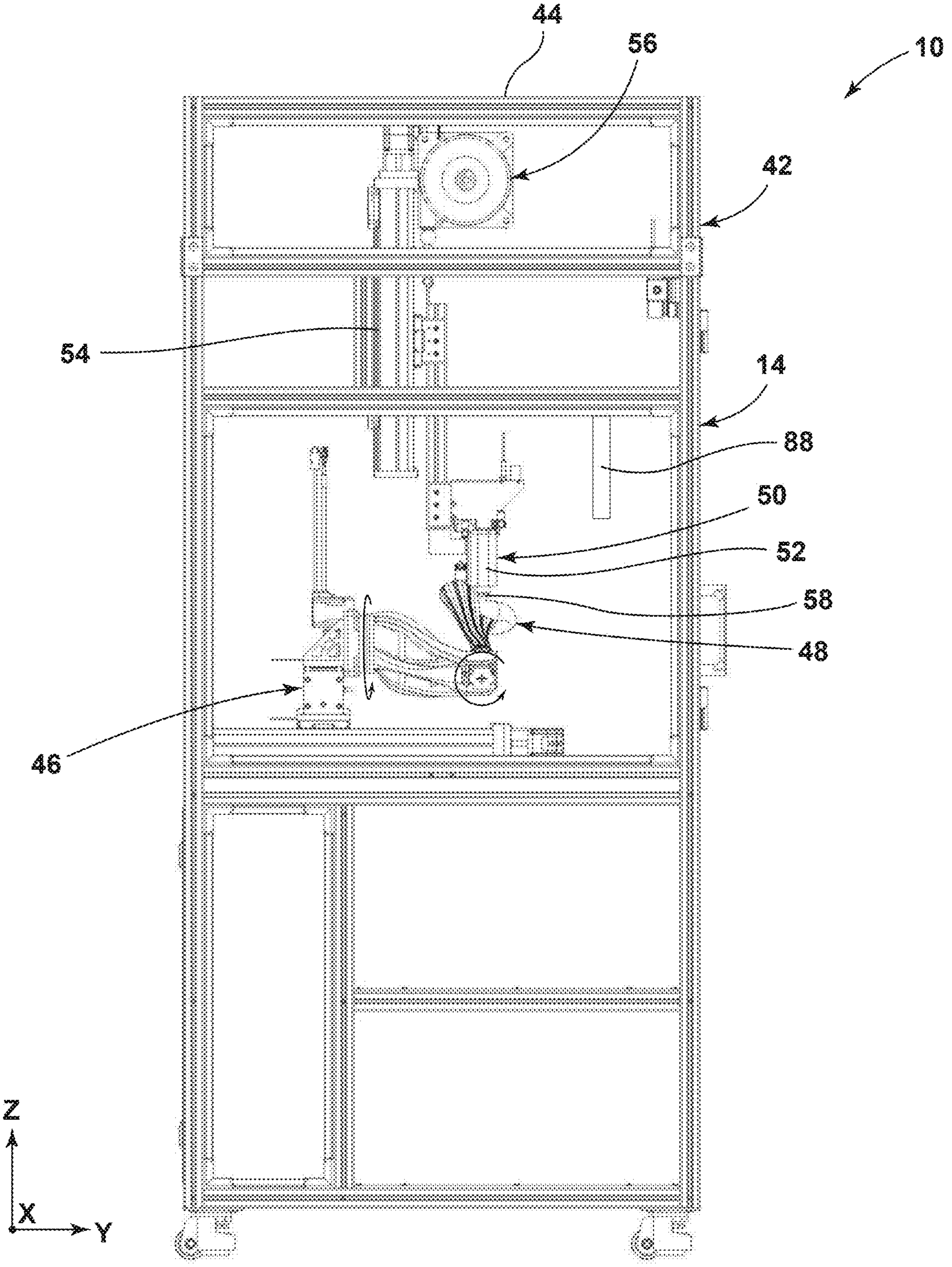
FIG. 1B is a side plan view of the additive machine according to example implementations of aspects of the present disclosure.
Figure 2:
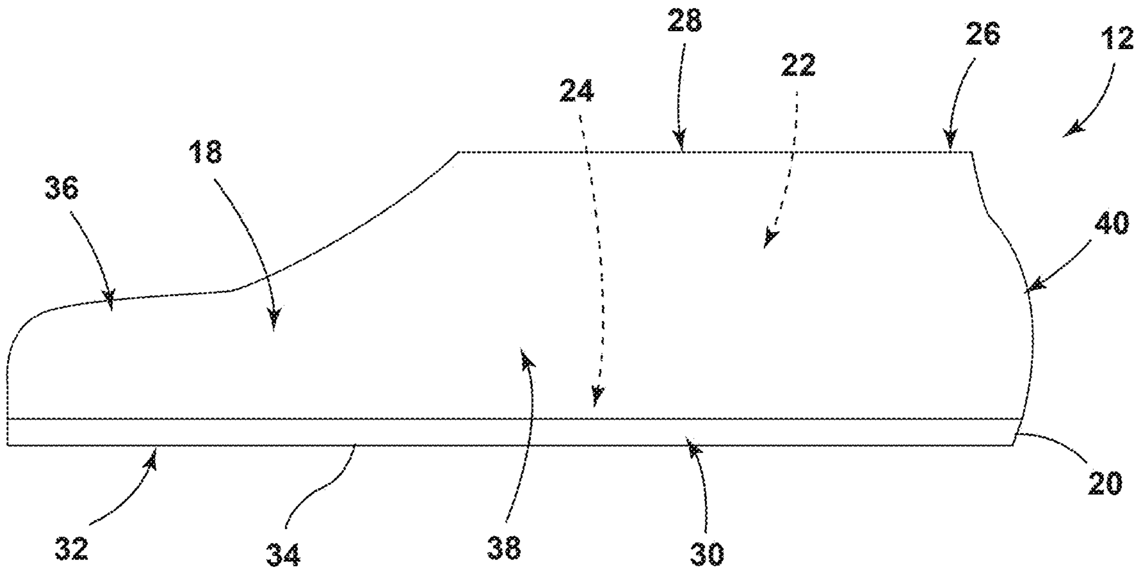
FIG. 2 is a side plan view of a shoe according to example implementations of aspects of the present disclosure.

As illustrated in FIGS. 1A-2, in some examples, the article 12 (or portions thereof, may be formed through an additive machine 14, which makes the article 12 based upon a computer-controlled program that instructs the additive machine 14 to deposit successive sections of additive material 16. The successive sections of additive material 16 may then fuse to form the printed article 12 (or portions thereof). For example, as illustrated in FIG. 2, the article may be in the form of footwear including an upper 18 and a sole structure 20. The upper 18 may be coupled with the sole structure 20 and together with the sole structure 20 may define an interior cavity 22 into which a foot of a user may be inserted. The upper 18 may also include an insole 24 positioned within the interior cavity 22 that may be connected to or in contact with an interior surface of the footwear. The insole 24 may directly contact a user's foot while the footwear is being worn. In some examples, an upper may include a liner 26 that makes the footwear more comfortable to wear, for example, by reducing friction between the foot of the user and the footwear when the footwear is being worn or providing moisture-wicking properties. The liner 26 may line the entire interior cavity 22 or only a portion of the interior cavity 22. In other instances, a collar or binding 28 may surround the opening of the interior cavity 22 to secure the liner 26 to the upper 18 or to provide an aesthetic element on the footwear. Furthermore, the sole structure 20 may include a midsole 30 and an outsole 32 coupled to and disposed generally below the midsole 30. The outsole 32 may define a bottom surface 34 of the footwear that is configured to contact the ground. In some embodiments, lugs (not shown) or other tractive elements may be provided along the bottom surface 34 to provide a user with increased traction. The footwear may generally define a forefoot region 36, a midfoot region 38, and a heel region 40. The forefoot region 36 generally corresponds with portions of the footwear that encase portions of the foot that include the toes, the ball of the foot, and joints connecting the metatarsals with the toes or phalanges. The midfoot region 38 is proximate and adjoining the forefoot region 36, and generally corresponds with portions of the footwear that encase the arch of a foot, along with the bridge of a foot. The heel region 40 is proximate and adjoining the midfoot region 38 and generally corresponds with portions of the footwear that encase rear portions of the foot, including the heel or calcaneus bone, the ankle, or the Achilles tendon.

With further reference to FIGS. 1A-2, the additive machine 14 may include a housing 42 that may include a plurality of frame members 44. The frame members 44 may define a structure for anchoring an articulation system 46, an end-piece 48, and/or a print system 50. In various examples, the housing 42 may encircle the articulation system 46, the end-piece 48, and/or the print system 50 (or portions thereof).

The articulation system 46 may be configured to alter a position of the end-piece 48, which may also be referred to as an end-effector, a jig, a form, a substrate, and/or any other component that may be operably coupled with the articulation system 46. In operation, the end-piece 48 is manipulated along a defined path as the print system 50 deposits the "road(s)" of material. In various examples, the articulation system 46 may include any number of actuators, motors, and/or any other device that manipulates the position of the end-piece 48 relative to the print system 50, the frame, and/or any other component of the additive manufacturing system 10. In some cases, the articulation system 46 may be configured to move in three or more directions, and in some cases, the articulation system 46 may be operated on four, five, six, twelve, and/or any other number of axes. For instance, as will be described in greater detail below, the articulation system 46 may be configured as a five-axis machine 14 and/or a six-axis machine 14.

The articulation system 46 is configured to manipulate the end-piece 48. The end-effector 48 may function as a base shape for a surface upon which the additive material 16 is deposited to form the article 12 (e.g., the shoe). For instance, the end-effector 48 may be specific to a particular shoe size, and therefore, switched to another sized end-effector 48 to manufacture a differently-sized shoe.

The print system 50 may include one or more print heads 52 from which the additive material 16 (e.g., a molten material) is discharged. The additive material 16 exiting the print head 52 is deposited in sections (or "roads") initially on the end-piece 48. Once deposited, the subsequent additive material 16 exiting the one or more print heads 52 solidifies to bind to a section (i.e., road) of the underlying material. The succession of superimposed sections (roads) thus combines into a body that forms the article 12 of the desired shape, such as the shoe.

With further reference to FIGS. 1A-7, the print system 50 may also include an adjustment actuator 54. The adjustment actuator 54 is configured to operably couple the print head 52 with the housing 42. The adjustment actuator 54 may include any device practicable for moving the print head 52 in any direction, such as ballscrew electric actuators, linear electric actuators, pneumatic cylinders, hydraulic cylinders, delta drives, belt systems, or any other practicable device. In some cases, the adjustment actuator 54 may be configured to move the print head 52 along the Z-axis (and/or any other axis). However, in some cases, the print system 50 may include a brace to couple the print head 52 with the housing 42 in a generally stationary manner.

The print system 50 may further include a material supply assembly 56, which may include a reel 170, that stores a supply of additive material 16 for the print system 50. In addition to or instead of the material supply assembly 56 is illustrated in FIGS. 1A-7, the print system 50 can include any other type of feeder. For instance, the feeder may be configured as a hopper that is configured to retain an additive material 16 (e.g., a pellet material, a powder material, a resin material, etc.) therein. In such examples, the additive material 16 can be drawn from the hopper.

Figure 3:
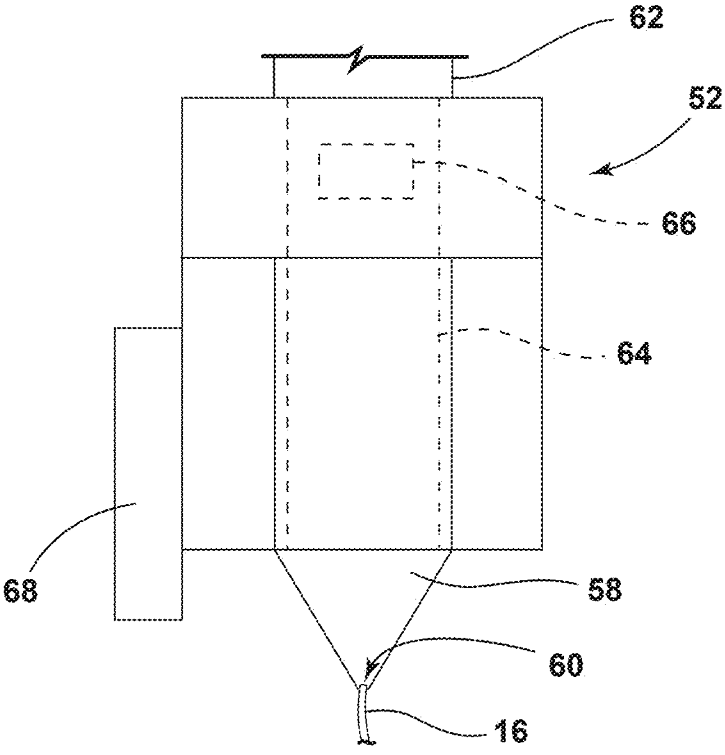
FIG. 3 is a schematic view of a print head of the additive machine according to example implementations of aspects of the present disclosure.
Figure 4:
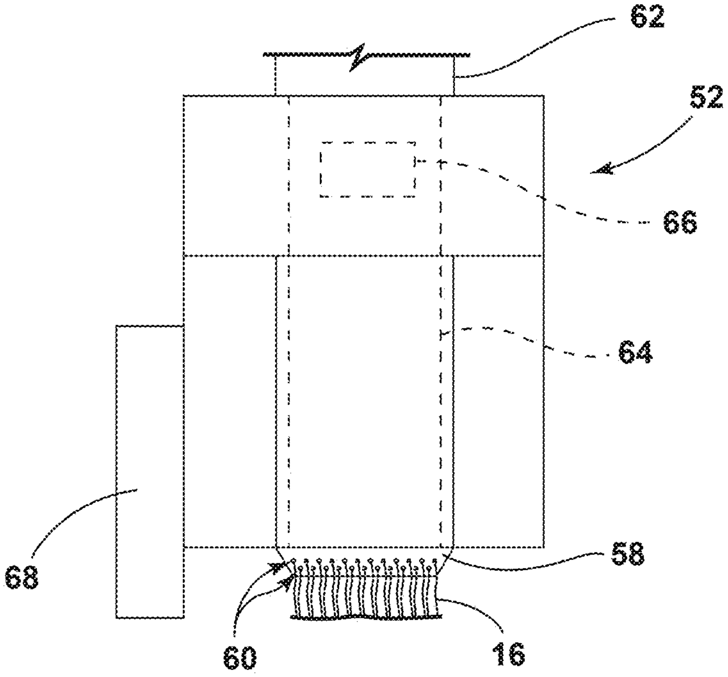
FIG. 4 is a schematic view of a print head of the additive machine according to example implementations of aspects of the present disclosure.
Figure 5:
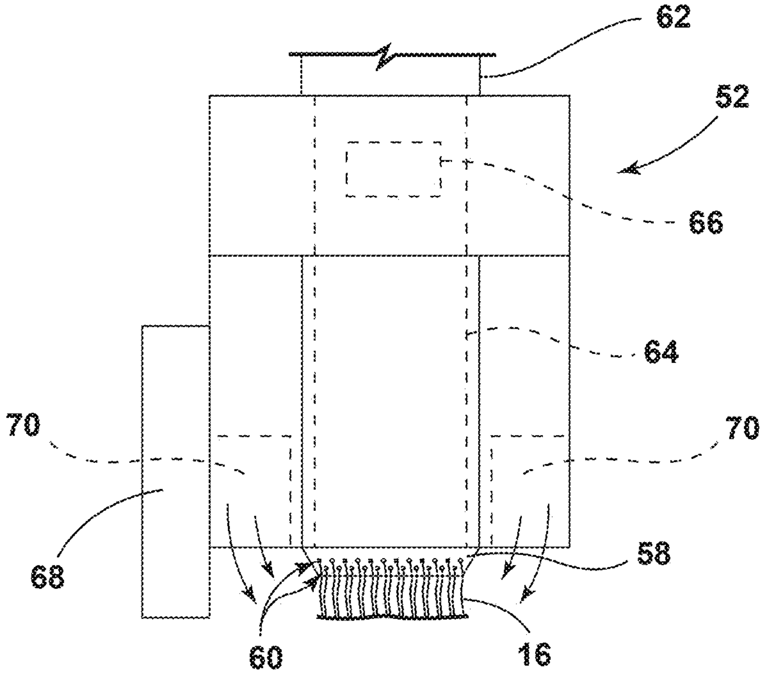
FIG. 5 is a schematic view of a print head of the additive machine according to example implementations of aspects of the present disclosure.

Referring to FIGS. 3-5, in various examples, a nozzle 58 may be positioned at a lower-end portion of the print head 52. In some cases, the nozzle 58 can define one or more dispensing orifices 60 for dispensing a flow of the additive material 16, which is fed to the print head 52 through a feeding conduit 62. In some cases, a heat source 66 may be configured to increase a temperature of the additive material 16 and a worm-drive gear system 64 (or another drive source) may move the additive material 16 through the one or more orifices 60. In some instances, the intensity of the heat source 66 can be controlled based on various factors, including, but not limited to, the composition of the additive material 16, the geometry of the road of the additive material 16, etc. The print head 52 is configured to cause the additive material 16 to exit the dispensing orifice 60 of the nozzle 58 to be deposited to form a "road" of material. As the end-piece 48 is moved relative to the nozzle 58 (and/or the nozzle 58 is moved relative to the end-piece 48), the road printed by each print head 52 is laid along a defined path. In various examples, a number of dispensing holes, a size or each of the dispensing holes, and/or a shape of the dispensing holes of the nozzle 58 may be selected to accommodate the type of the additive material 16, the temperature of the additive material 16 that is to be dispensed, the additive process being used, the dimensions of the road of additive material 16 being printed from the dispensing orifice 60 by the print head 52, etc.

With further reference to FIGS. 3-5, in some instances, the print head 52 may further include a sensing device. The sensing device may be configured as a probe 68 and/or any other device that is configured to capture data indicative of a position of the article 12, the end-piece 48, or the print head 52 relative to any other component of the additive manufacturing system 10. Additionally or alternatively, the probe 68 may also be configured to capture data indicative of characteristics of the article 12, and/or any other condition.

Referring further to FIG. 4, the nozzle 58 may define multiple orifices 60. In such instances, the multiple filaments of additive material 16 may be extruded simultaneously through the nozzle 58, which disposes the multiple filaments on one another during a common pass of the end-piece 48 along the first nozzle 58 to define gaps between the multiple filaments. The gaps and the additive material 16, in conjunction with one another, may form controlled instabilities in the form of loops and aggregation of material with defined gaps between the roads. Thus, the multiple roads formed within this section may have a varied compression level, or other characteristic, from the remaining sections of the article 12. For example, the characteristics can include density, compression/firmness, aesthetic appearance, thickness of material deposited on the end-piece 48, and/or a previous section. Additionally or alternatively, the multiple filaments of additive material 16 may be extruded simultaneously through the first nozzle 58 and dispose the multiple filaments adjacently to one another during a common pass of the end-piece 48 along the first nozzle 58 to define no gaps between the multiple filaments and a substrate upon which the multiple filaments are disposed, which may form a textile-like pattern.

Now referring to FIG. 5, in some cases, the nozzle 58 may define multiple orifices 60. In such instances, the multiple filaments of additive material 16 may be extruded simultaneously through the nozzle 58. In addition, a blower 70 may be configured to blow the multiple filaments towards a defined location.

Referring back to FIGS. 1A-7, the print heads 52 extrude any type of material that can be used to manufacture a defined article 12, such as a shoe, and have long-term stability and durability after extrusion. In some instances, the print heads 52 extrude a thermoplastic resin in the form of fibers. For instance, each print head 52 may extrude a fiber having a different cross-sectional thickness depending on the intended placement on the shoe. To provide an environmentally-friendly shoe, i.e. one that can break down in the environment, the additive material 16 may use a bio-derived and biodegradable thermoplastic resin, such as a polyhydroxyalkanoate (PHA), to manufacture the article 12. It will be appreciated that any PHA polymer may be used. For example, poly(3-hydroxybutyrate) (PHB), may be used as a starting material. When PHB is co-polymerized with 3-hydroxyvalerate (3HV), it generates poly(3-hydroxybutyrate-co-3-hydroxyvalerate) (PHBV). This PHBV has increased plasticity, toughness, and biodegradability compared to PHB, making PHBV a useful polymer for manufacturing an elastomeric biodegradable additive material 16. Another type of PHA is poly (3-hydroxybutyrate-co-4-hydroxyvalerate) (P3H4HB) which can be prepared as a random copolymer of P3HB and P4HB in various ratios. In some implementations, P3HB4HB with a mole ratio of 70% P3HB and 30% P4HB PHB, PGBV, and other types of PHAs are typically classified as aliphatic polyesters. In various examples, the PHA is a mixture of poly(3-hydroxybutyrate-co-4-hydroxyvalerate) (P3H4HB) and poly(3-hydroxybutyrate-co-3-hydroxyvalerate) (PHBV). The ratio of P3H4HB to PHBV may range from about 1:5 to about 5:1, from about 1:2 to about 2:1, or from about 1:1.5 to about 1.5:1. In one embodiment, the ratio of P3H4HB to PHBV may be about 1:1. In some examples, the additive material 16 may be at least 51% PHA, with the remaining 49% being an excipient, i.e. a non-PHA material. In various examples, the additive material 16 may comprise at least about 80% PHA, or at least about 90% PHA. In further examples, the additive material 16 may be almost entirely or entirely comprised of PHA. The PHA in the additive material 16 may have a percentage of amorphous content. In certain examples, the amorphous content of the PHA in the additive material 16 may comprise at least about 30%, about 40%, or about 50%. In some examples, the additive material 16 may have an elasticity in the range of about 10% to about 1000%. In some instances, the additive material 16 has an elasticity in the range of about 10% to about 800%, or about 10% to about 300%. In several examples, the non-biodegradable content of the additive material 16 is less than about 49% signifying that articles 12 prepared thereof can substantially degrade in the environment. In more particular examples, the additive material 16 may have a non-biodegradable content of less than about 20%, or less than about 10%, or less than about 5%, or less than 1%, or even less than 0.1% so that the non-biodegradable content is minimized or practically eliminated.

Excipients (i.e. non-PHA content) in the additive material 16 may be biodegradable, nonbiodegradable, or combinations or blends of both kinds of materials. One or more excipients may be present in the additive material 16, and a non-limiting group of excipients may include other non-PHA polymers, poly(lactic acid), cellulose, nucleation agents, chain extenders, colorants, antifreeze agents, plasticizers, and/or fillers. In various examples, the additive material 16 may have an excipient content (of biodegradable material, non-biodegradable material, or a combination of both) of not more than about 10%.

In some cases, the additive material 16 may be configured as a single of multiple fiber yarn formed either from multiple PHA additive materials 16 wound or twisted together or from PHA additive materials 16 wound or twisted with filaments of other materials. The cross section of the fiber may have any shape and does not necessarily need to be circular. The ratio of the components of the additive material 16 as described herein can be in terms of weight ratios, mole ratios, volume ratios, or other suitable or convenient measurements.

Figure 6:
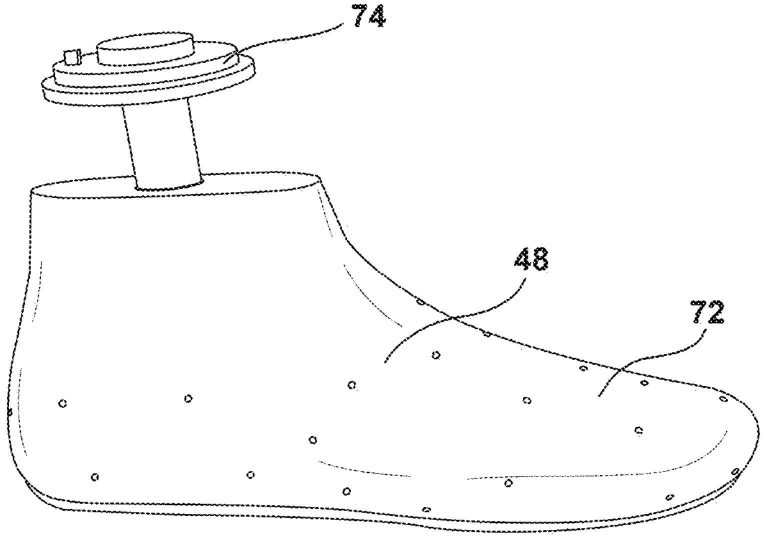
FIG. 6 is a side plan view of an end-piece according to example implementations of aspects of the present disclosure.

Referring now to FIG. 6, the end-effector 48, according to various examples, is illustrated. In various cases, the end-effector 48 may be a static three-dimensional object that is attached to the end of the articulation system 46, such as with fasteners such as bolts, screws, clips, etc. In several examples, the articulation system 46 may move the end-effector 48 to receive the additive material 16 while the print heads 52 are static. Additionally or alternatively, the print heads 52 may have one or more degrees of motion, such as along the Z-axis, to move the print head 52, which may be moved to accommodate the usage of another print head 52, based on the movement of the articulation system 46, to account for thickness buildup of the shoe during manufacturing, and/or for any other purpose.

As illustrated, the end-effector 48 may have a shoe-shaped form 72 (or the form of any other article 12) and an extension 74 for attachment to the articulation system 46. The extension 74 may be affixed to the articulation system 46 using any mode of fastening, such as screws, clamps, collets, bands, or other fasteners.

In several examples, the end-piece 48 may be additively-manufactured, CNC milled, and/or formed through any other manufacturing process. In addition, the end-piece 48 may be formed from a polymeric material, a metallic material (e.g., aluminum), a ceramic material, and/or any other material. As the end-effector 48 may be used as a shoe last and, therefore, may be generally non-deforming, its materials of construction may be of any material such that the shoe can be removed from the end-effector 48 at the end of manufacture. The end-effector 48 may be configured to be heated or cooled, for example, via zone heating or cooling, in cases in which the end-effector 48 may have a particular temperature during the manufacture of a shoe. In other embodiments, an end-effector 48 may be inflatable or have expandable parts, so that a single end-effector 48 may be used to manufacture shoes of varying sizes.

Figure 7:
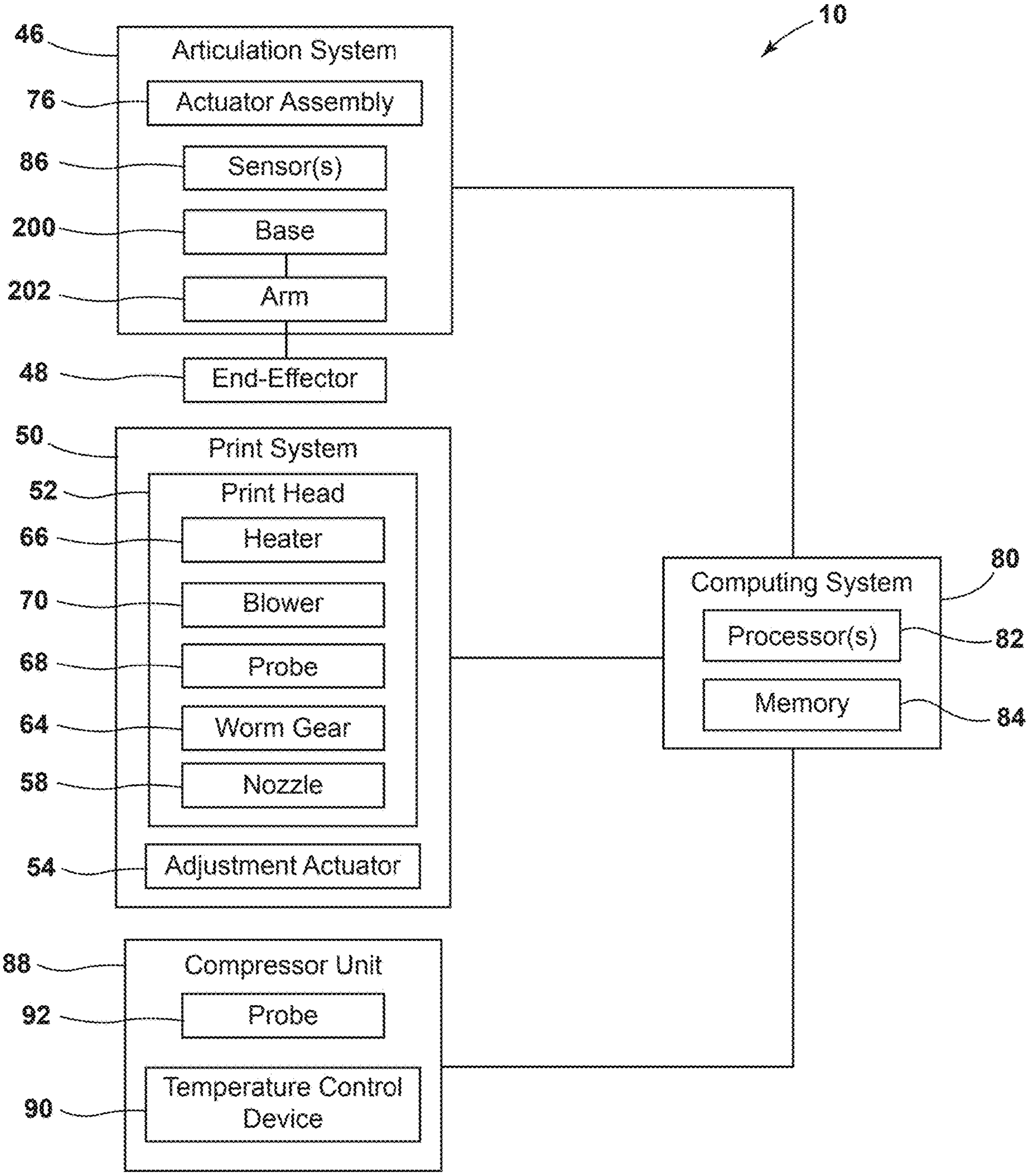
FIG. 7 is a schematic diagram of an additive manufacturing system that may be configured to control the additive machine according to example implementations of aspects of the present disclosure.

Referring now to FIG. 7, a schematic view of the additive manufacturing system 10 is illustrated in accordance with aspects of the present subject matter. In general, the print system 50 and/or the articulation system 46 may be operably coupled with a computing system 80 that may be configured to control various components of more than one print system 50. The computing system 80 may include any suitable processor-based device, such as a computing device or any suitable combination of computing devices. Thus, in several embodiments, the computing may include one or more processors 82 and associated memory 84 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 84 may generally include memory element(s) including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 84 may generally be configured to store suitable computer-readable instructions that, when implemented by the processor 82, configure the computing to perform various computer-implemented functions. In addition, the computing may also include various other suitable components, such as a communications circuit or module, one or more input/output channels, a data/control bus, and/or the like.

It will be appreciated that, although the various control functions and/or actions will generally be described herein as being executed by the computing system 80, one or more of such control functions/actions (or portions thereof) may be executed by a separate computing system or may be distributed across any combination of one or more computing systems (including, for example, the computing system 80 and/or a separate computing system).

As shown, the print system 50 may include an adjustment actuator 54 that is configured to operably couple the print head 52 with the housing 42. The print system 50 may also include one or more print heads 52. Each of the print heads 52 may include a nozzle 58, a heater, a probe 68, and/or a blower 70. As will be discussed herein, the computing system 80 may implement various additive processes to form one or more sections of the article 12 with the assistance of these components.

As shown, the articulation system 46 may include actuator assembly 76 including one or more actuators that are configured to manipulate a position of the end-piece 48 relative to the print heads 52. As provided herein, the articulation system 46 may be operated on four, five, six, twelve, and/or any other number of axes. For instance, as will be described in greater detail below, the articulation system 46 may be configured as a five-axis machine 14 and/or a six-axis machine 14. In various examples, the articulation system 46 may also include one or more sensors 86 that may be configured to detect a position of each actuator, which in turn, may be used to determine a position of the end-piece 48.

The additive manufacturing system 10 may additionally or alternatively include a compressor unit 88, which may be configured to compress the additive material 16 to alter a characteristic of the material. In some cases, the compressor unit 88 may be positioned within a working envelope of the articulation system 46 such that the article 12 on the end-piece 48 may be selectively moved between the nozzle 60 and the compressor unit 88. For example, the compressor unit 88 is a weighted rod with a rigid or soft pad at a distal end portion. The compressor unit 88 may also include a temperature device 90 that is configured to raise and/or lower a temperature of the distal end portion of the rod. In some cases, the compressor unit 88 may also include a probe 92. The probe 92 may be configured to capture data indicative of a position of the article 12, the end-piece 48, or the print head 52 relative to any other component of the additive manufacturing system 10. Additionally or alternatively, the sensing device may also be configured to capture data indicative of characteristics of the article 12, and/or any other condition. In operation, the articulation system 46 may move the article 12 to the compressor unit 88 such that a specific applied force, optionally with the application of heat or chilling, is applied to the article 12 to allow the additive material 16 to be compressed, and optionally fused or consolidated, thereby altering the density and/or rigidity of a specific portion of the article 12. In various examples, different portions of the article 12 may be compressed to different fiber densities.

In operation, the computing system 80 may be configured to receive an input related to a defined shoe design. In turn, the computing system 80 may be configured to determine a first additive process and a second additive process to additively manufacture the defined shoe. Additionally or alternatively, the computing system 80 may be configured to determine an end-piece through actuation of the articulation system 46 for each of the first additive process and the second additive process, control the print system 50 and the articulation system 46 to extrude the additive material 16 from the print system 50 during the first additive process. Additionally or alternatively, the computing system 80 may be configured to control the print system 50 and the articulation system 46 to extrude the additive material 16 from the print system 50 during the second additive process. The first additive process may form a first section of the shoe and the second additive process may form a second section of the shoe. In some instances, the print system 50 includes a first print head 52 and a second print head 52 each within a working envelope of the articulation system 46. The first print head 52 may extrude additive material 16 during the first additive process and the second print head 52 may extrude additive material 16 during the second additive process. Moreover, the first print head 52 extrudes the additive material 16 with a first cross-sectional diameter and the second print head 52 extrudes the additive material 16 with a second cross-sectional diameter. The first cross-sectional diameter may be varied from the second cross-sectional diameter.

Figure 8:
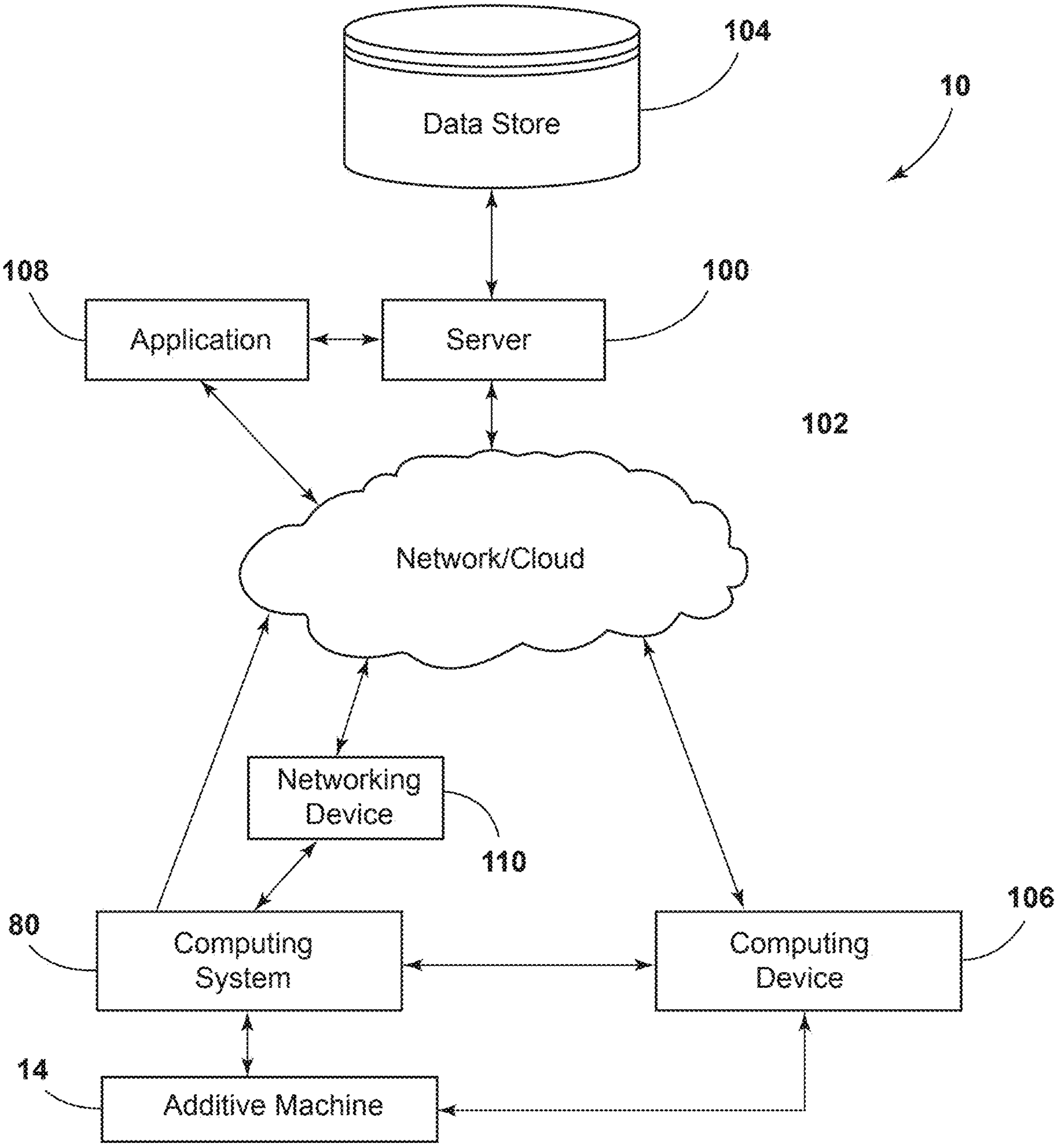
FIG. 8 is a schematic diagram of the additive manufacturing system according to example implementations of aspects of the present disclosure.

Referring now to FIG. 8, in some examples, the additive machine 14 may be communicatively coupled with one or more remote sites, such as a remote server 100, via a network/cloud 102. The network/cloud 102 represents one or more systems by which the additive machine 14 may communicate with the remote server 100. Accordingly, the network/cloud 102 may be one or more of various wired or wireless communication mechanisms, including any desired combination of wired and/or wireless communication mechanisms and any desired network topology (or topologies when multiple communication mechanisms are utilized). Example communication networks 102 include wireless communication networks (e.g., using Bluetooth, IEEE 802.11, etc.), local area networks (LAN), and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 102 in FIG. 8). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that may be rapidly provisioned and released with minimal management effort or service provider interaction." Although the Internet, the Web, and cloud computing are not exactly the same, these terms are generally used interchangeably herein, and they may be referred to collectively as the network/cloud 102.

The server 100 may be one or more computer servers, each of which may include at least one processor and at least one memory, the memory storing instructions executable by the processor, including instructions for carrying out various steps and processes. The server 100 may include or be communicatively coupled to a data store 104 for storing collected data as well as instructions for operating the additive machine 14 that may be directed to and/or implemented by the computing system 80 with or without intervention from a user and/or a computing device 106.

In some examples, the instructions may be inputted through the computing device 106 and relayed to the server 100. Those instructions may be stored in the server 100 and/or a data store 104. At various predefined periods and/or times, the additive machine 14 may communicate with the server 100 through the network/cloud 102 to obtain the stored instructions, if any exist. Upon receiving the stored instructions, the additive machine 14 may implement the instructions. The server 100 may additionally store information related to multiple additive machine 14s and/or multiple print heads 52, usage characteristics, errors, etc., and operate and/or provide instructions to the additive machine 14 in conjunction with the stored information with or without intervention from a user and/or the computing device 106.

With further reference to FIG. 8, the server 100 also generally implements features that may enable the additive machine 14 to communicate with cloud-based applications 108. Communications from the additive machine 14 can be directed through the network/cloud 102 to the server 100 and/or cloud-based applications 108 with or without a networking device 110, such as a router and/or modem. Additionally, communications from the cloud-based applications 108, even though these communications may indicate one of the additive machines 14 as an intended recipient, can also be directed to the server 100. The cloud-based applications 108 are generally any appropriate services or applications 108 that are accessible through any part of the network/cloud 102 and may be capable of interacting with the additive machine 14.

In various examples, the computing device 106 can be feature-rich with respect to communication capabilities, i.e. have built-in capabilities to access the network/cloud 102 and any of the cloud-based applications 108 or can be loaded with, or programmed to have such capabilities. The computing device 106 can also access any part of the network/cloud 102 through industry-standard wired or wireless access points, cell phone cells, or network nodes. In some examples, users can register to use the remote server 100 through the computing device 106, which may provide access to the additive machine 14 and/or thereby allow the server 100 to communicate directly or indirectly with the additive machine 14. In various instances, the additive machine 14 may also communicate directly, or indirectly, with the computing device 106 or one of the cloud-based applications 108 in addition to communicating with or through the server 100. According to some examples, the additive machine 14 can be preconfigured at the time of manufacture with a communication address (e.g. a URL, an IP address, etc.) for communicating with the server 100 and may or may not have the ability to upgrade or change or add to the preconfigured communication address.

Referring still to FIG. 8, when a new cloud-based application 108 is developed and introduced, the server 100 can be upgraded to be able to receive communications for the new cloud-based application 108 and to translate communications between the new protocol and the protocol used by the additive machine 14. The flexibility, scalability, and upgradeability of current server technology renders the task of adding new cloud-based application protocols to the server 100 relatively quick and easy.

In some instances, the methods and algorithms of the processor(s) 82 of the computing system 80, the processor(s) of the computing device 106, and/or the at least one processor of the server 100 can be implemented using a machine learning engine (MLE) that utilizes one or several machine learning techniques including, for example, decision tree learning, including, for example, random forest or conditional inference trees methods; neural networks; support vector machines; clustering; and Bayesian networks. These algorithms can include computer-executable code that can be retrieved by the memory 84 of the computing system 80, the memory of the computing device 106, and/or the remote server 100 and used to generate a predictive evaluation of the article characteristics.

Figure 9:
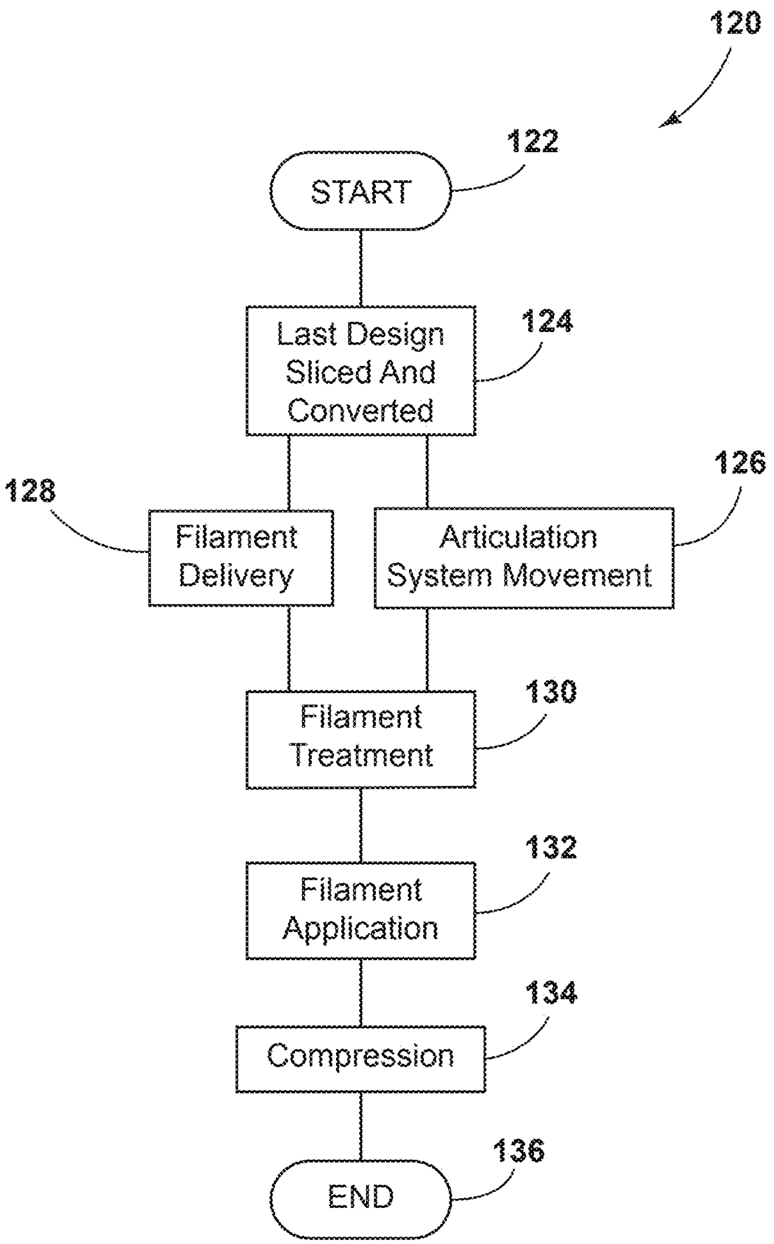
FIG. 9 is a flow diagram of a procedure for operating the additive manufacturing system according to example implementations of aspects of the present disclosure.
Figure 10A:
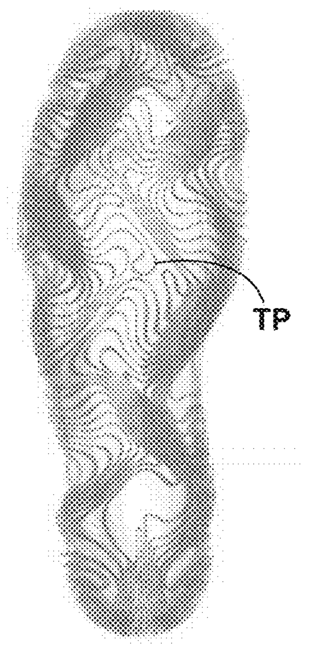
FIGS. 10A-10D are various perspective views of a tool path or an end-piece path of the additive machine according to example implementations of aspects of the present disclosure.
Figure 10B:
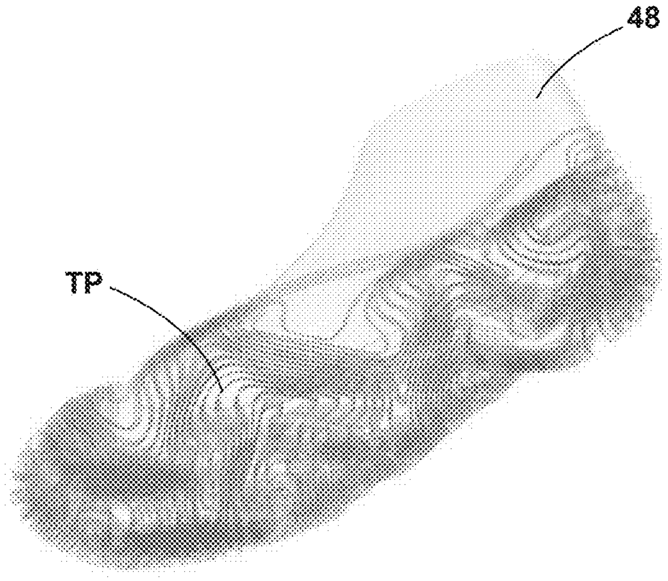
Figure 10C:
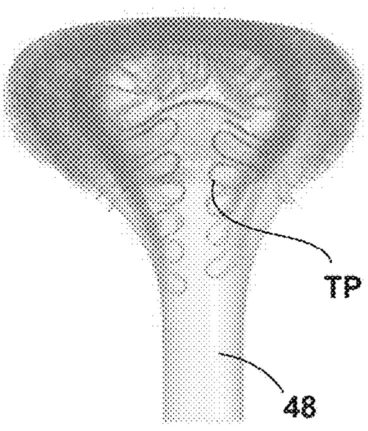
Figure 10D:
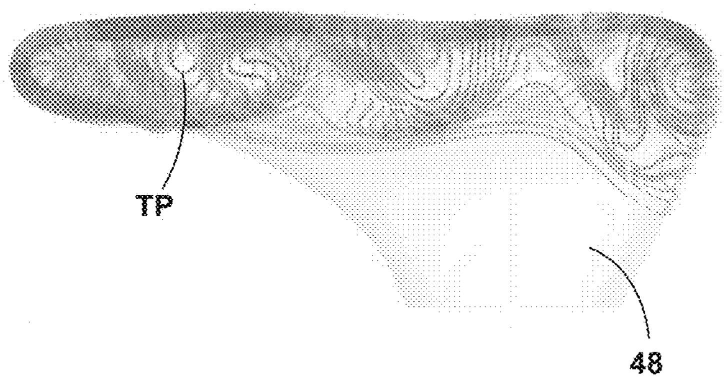

Referring now to FIGS. 9-10D, in operation, the manufacturing system provided herein may be used to form various articles 12, through various methods 120 such as the one illustrated in FIG. 9. In such examples, at (122), a three-dimensional model of an article 12, such as a defined shoe design, may be selected or customized from a set of designs, or a design may be inputted into the computing system 80 in any other manner. The selection of the design may be made through the computing system 80 and/or from a remote device that is operably coupled with the additive machine 14 through the network/cloud. Once the shoe design is defined, at (124), the defined shoe design may undergo a conversion and slicing procedure by the computing system 80, during which the design is analyzed and reconfigured as a series of separate tool paths TP or an end-piece for the end-piece 48. As shown in FIGS. 10A-10D, the tool path TP may be non-parallel to any or all of the axes of the additive machine 14 (e.g., one or more of the X-axis, the Y-axis, the Z-axis, and/or one or more rotational axes). Moreover, the design may include or define one or more sections having varied characteristics from one another. The various sections may be formed through one or more additive processes. For instance, the various additive processes may include non-planar additive deposition, multi-filament extrusion, multifilament texture deposition, high-fidelity melt-blowing, spun deposition, dipping, welding/bonding, pressing/densifying, and/or any other additive process. Each section may be formed by operating the print head 52 in a defined manner. As such, the series of tool paths TP may include a tool path TP for each section based on the defined design and the additive process to form the various sections of the defined design. These tool paths TP are generated to be performed sequentially and/or concurrently, depending on the defined design. These tool paths TP may also include commands for heating and flow rate for the print heads 52 based at least on the additive process for each section of the article 12. Once the tool paths TP and commands are complete, the computing system 80 operates the print system 50 and the articulation system 46 in accordance with the instructions. As the articulation system 46, at (128), is manipulated to move the end-piece 48 along the tool path TP, the additive material 16 is extruded into filaments. At (130), the filaments may undergo heat treatment in the printer head, and air flows may be also adjusted as necessary depending on the material that is to be added to the article 12. At (132), the extruded single filament or multiple filament is then applied to the end-effector 48 (or to a base section on the end-effector 48 such as a previously knitted, woven, or non-woven sock) that may be attached to the distal end portion of the articulation assembly.

The additive manufacturing procedure is a dynamic operation whereby the emerging shoe form is built up by the one or more printer heads, allowing the one or more printer heads to add additive material 16 at the appropriate position on the article 12 and stage of manufacture to construct the article 12. During manufacture, the one or more printer heads may deposit a solid filament extrusion onto an initial surface section, an initial knitted sock section, or directly upon the surface of the end-piece 48. The articulation assembly, operating in conjunction with the one or more printer heads, can allow the creation of doubly-curved surfaces and ensures precise deposition of the additive material 16 to form the article 12. In certain examples, the additive machine 14 may include dedicated one or more printer heads that extrude fibers of varying widths, such as a coarser-width fiber and a finer-width fiber. For example, a second printer head can be equipped with a melt-blown nozzle 58 that extrudes finer fibers onto the growing shoe structure. The extruded non-woven material from the one or more printer heads becomes the shoe's upper, insole, midsole, and outsole, eliminating the need for traditional sewing processes. At (134), sections of a shoe may also undergo compression through the compression unit. For example, the articulation assembly may apply pressure to the compression unit to aid in section adhesion or to change the stiffness of material applied to a certain portion, such as the heel of a shoe, to modify shoe properties at particular portions of the shoe, e.g. more firmness in the sole and more flexibility along the upper.

After manufacturing has concluded, the article 12 may be removed from the end-effector 48. A final quality control check may be performed by a monitor to ensure that the article 12 is acceptable, and to remove any remnants from the manufacturing process as may be desirable, for example, to remove stray threads. The shoe may then be packaged for presentation to the customer or for delivery. The shoe is donned by the wearer in the usual manner. In certain embodiments, the shoe may have fasteners such as laces, buckles, hook-and-loop (Velcro™) fasteners, or other closures. In other embodiments, the shoe may be manufactured as a slip-on shoe for ease of wear. These closures may be 3D-printed or they may be pre-manufactured and affixed to the shoe at an appropriate stage of manufacture. A sewing unit may embroider a design such as a manufacturer's logo on the shoe, or bind or stitch together the extruded fibers at one or more particular areas of the shoe. A compressor unit 88 can also adjust the properties of applied materials as a shoe is being made. The compressor unit 88 can also help provide section adhesion or fusion, for example, densifying certain sections of the shoe, such as the toe or heel.

The manufacturing system may also have finishing elements to complete the manufacturing process. Finishing elements may include a circular cutting blade, drills, a steamer or iron, a cutter/trimmer, a sewing or stitching unit, or a mold/press unit. Such elements may serve to trim away unnecessary materials or obtain smooth seam lines, configure the final shoe, appearance, or surface of the article 12, or bind or fuse the various article components so that they remain together over the lifetime of the article 12. As a final step, the manufacturer's or designer's logo or indicia may be applied to the shoes for identification or marketing purposes, which may end the process at (136).

Figure 11:
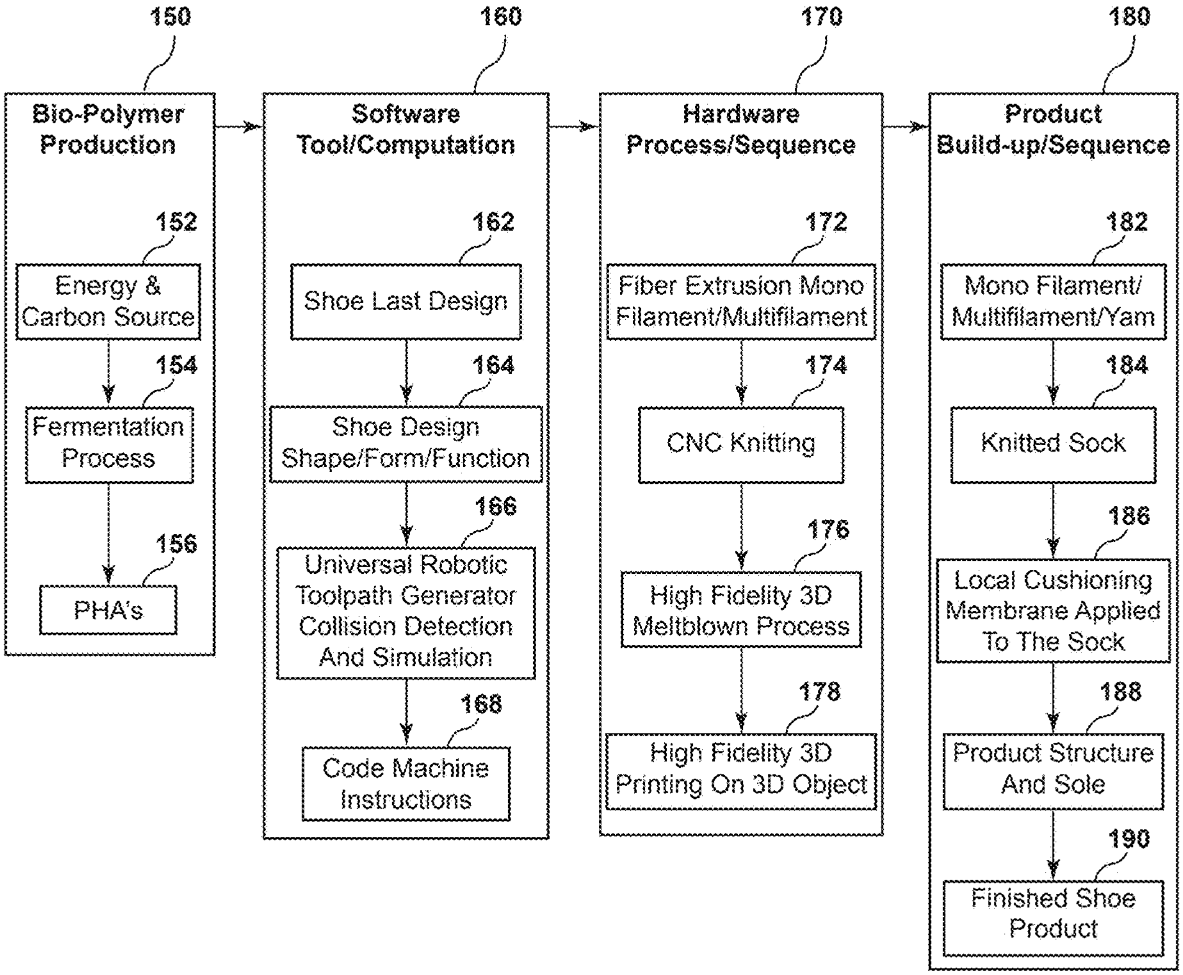
FIG. 11 is a flow diagram of a procedure for operating the additive manufacturing system according to example implementations of aspects of the present disclosure.

Referring now to FIG. 11, an example of a manufacturing life-cycle from additive material 16 generation to formed article 12 is illustrated. The manufacturing life-cycle may include the preparation of the additive material 16 at 150, which may be in the form of a bio-polymer, the generation of the machine instructions to prepare a shoe in accordance with a customer's design selection at 160, extruding the fibers to form the shoe at 170, and manufacturing the shoe by the additive machine 14 using the machine instructions at 180.

In some cases, the preparation of an additive material 16 may include producing a bio-polymer at 150. In various instances, as provided herein, the bio-polymer may be a PHA (polyhydroxyalkanoate) material, which is a bio-polymer that is a naturally biodegradable polyester that can be synthesized by numerous microorganisms (such as Cupriavidus necator), including through bacterial fermentation of sugars or lipids. In some cases, at (152), with the provision of energy and a carbon source, (at 154), the bacteria can be grown in a fermentation process and the PHA polymers can be isolated from the fermentation mixture for subsequent use, at (156). Preparation of PHA (or any other additive material 16) via a biological process may be used as a more environmentally-benign process over the use of polymers manufactured from extracted petroleum.

With regards to the generation of the machine instructions to prepare a shoe in accordance with a customer's design selection, as provided herein, at (160), computer algorithms may be used to convert a shoe design into machine instructions for manufacturing the shoe. In such instances, at (162), a defined shoe's last design is analyzed and algorithms convert the digital representation into a digital pattern, taking into account the shoe design shape and form (e.g. flats) and function of the shoe (e.g. for walking, sports, or casual wear), at (164). The algorithms convert the shoe design into a series of manufacturing steps for manufacturing the shoe. In some instances, the algorithms use collision detection and simulation to minimize the chances that the manufacturing equipment may cause an error state due to conflicting instructions, at (166). From these toolpaths, the procedure generates machine instruction code that provides the step-by-step control instructions to cause each of the components of the additive machine 14 to prepare the shoe, at (168).

With regards to extruding the fibers to form the shoe, at (170), additive material 16 (for example, PHA fibers or other thermoplastic fibers) is extruded in the form of a monofilament or multifilament, at (172). These fibers are then knitted or woven together, at (174), to form a material that can be used as a bottom section or base material for the shoe. At (174), the bottom section may be formed as a sock or similar shape. The CNC knitting step may be performed using a conventional knitting machine to knit the sock which forms an interface between the end-effector 48 and the additive extrusion processes. The CNC knitting machine is controlled by the computer to prepare the sock. In alternative embodiments, a sock is not used and fibers are extruded directly on the end-effector 48, or the sock is manufactured via weaving or other process. During a subsequent additive process, at (176), a 3D melt-blown process and/or at (178), a high-fidelity robot printing or extrusion of the thermoplastic on the end-effector 48 builds up the shoe upper, sole, and other sections of the shoe in various sections, which may each have their own tool path TP. In various examples, the yarn for the sock may be pre-manufactured in quantity in a prior step so that a spool of yarn is available from which the sock may be knit, without needing to extrude the sock fiber for each shoe.

With regards to manufacturing the shoe by the additive machine 14 using the machine instructions, at (182), a monofilament, multiple filament, or yarn may be prepared and used to manufacture, for example, via knitting or weaving, at (184), which functions as a base section for further manufacture. The sock functions as a base section upon which additional sections of additive material 16 may be deposited to build up the article 12. Local cushioning is applied to the sock, at (186), and the cushioning can be premanufactured or prepared as part of the shoe manufacturing process. The shoe structure and sole are built up using additive manufacturing as described herein at (188), and the resultant shoe, at (190), is ready for wear by the customer.

Figure 12:
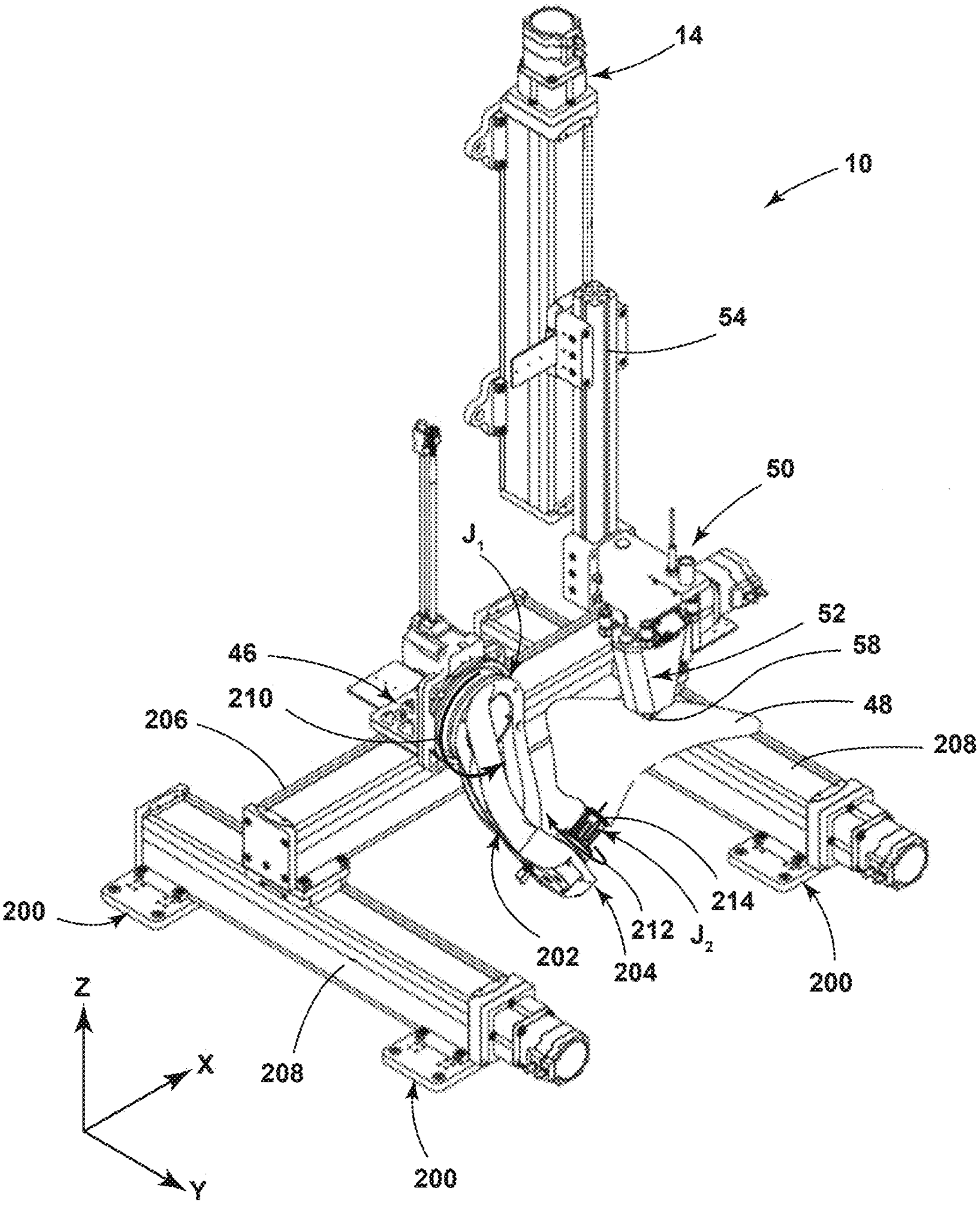
FIG. 12 is a perspective view of the additive machine according to example implementations of aspects of the present disclosure.
Figure 13:
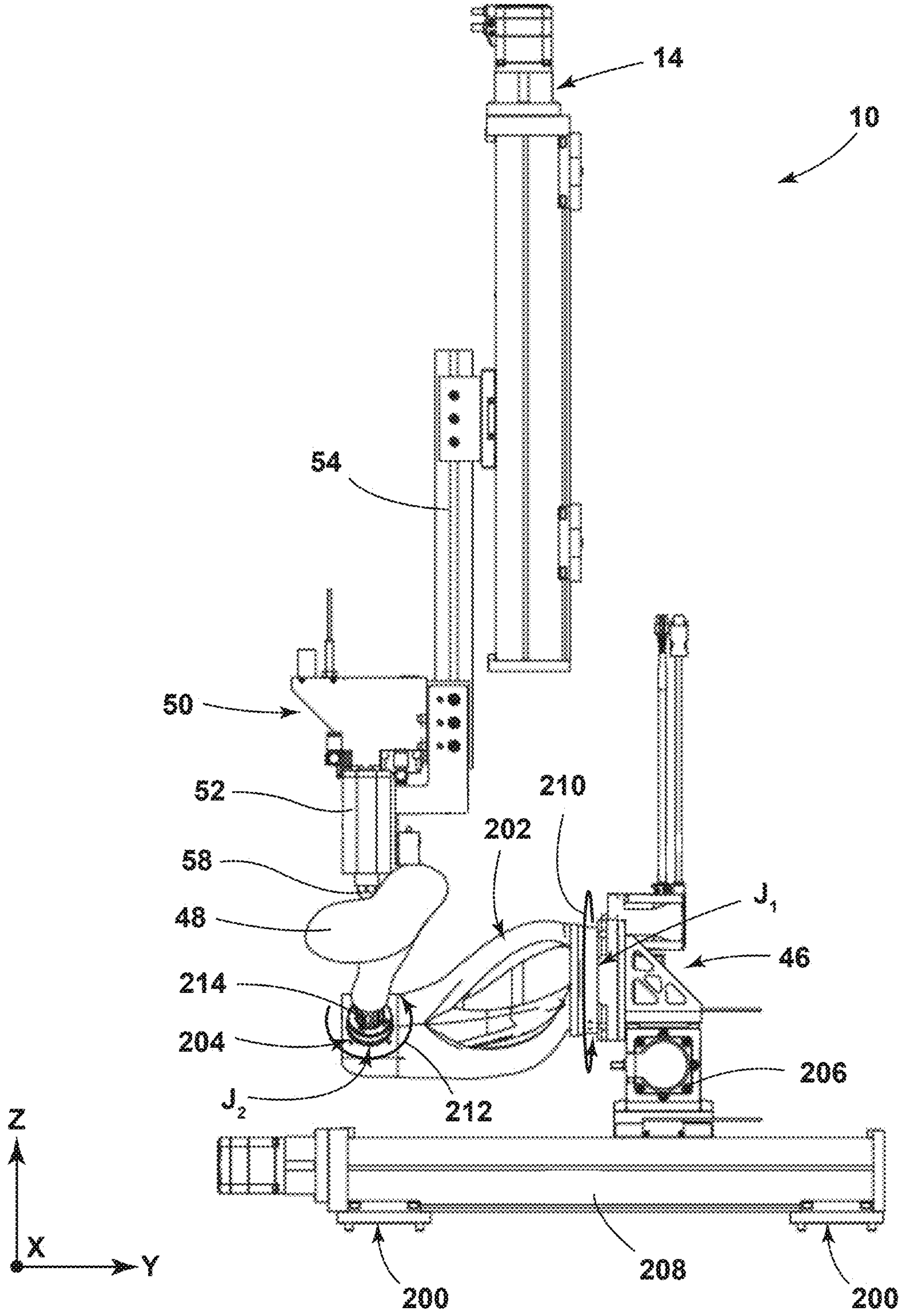
FIG. 13 is a plan view of the additive machine according to example implementations of aspects of the present disclosure.
Figure 14:
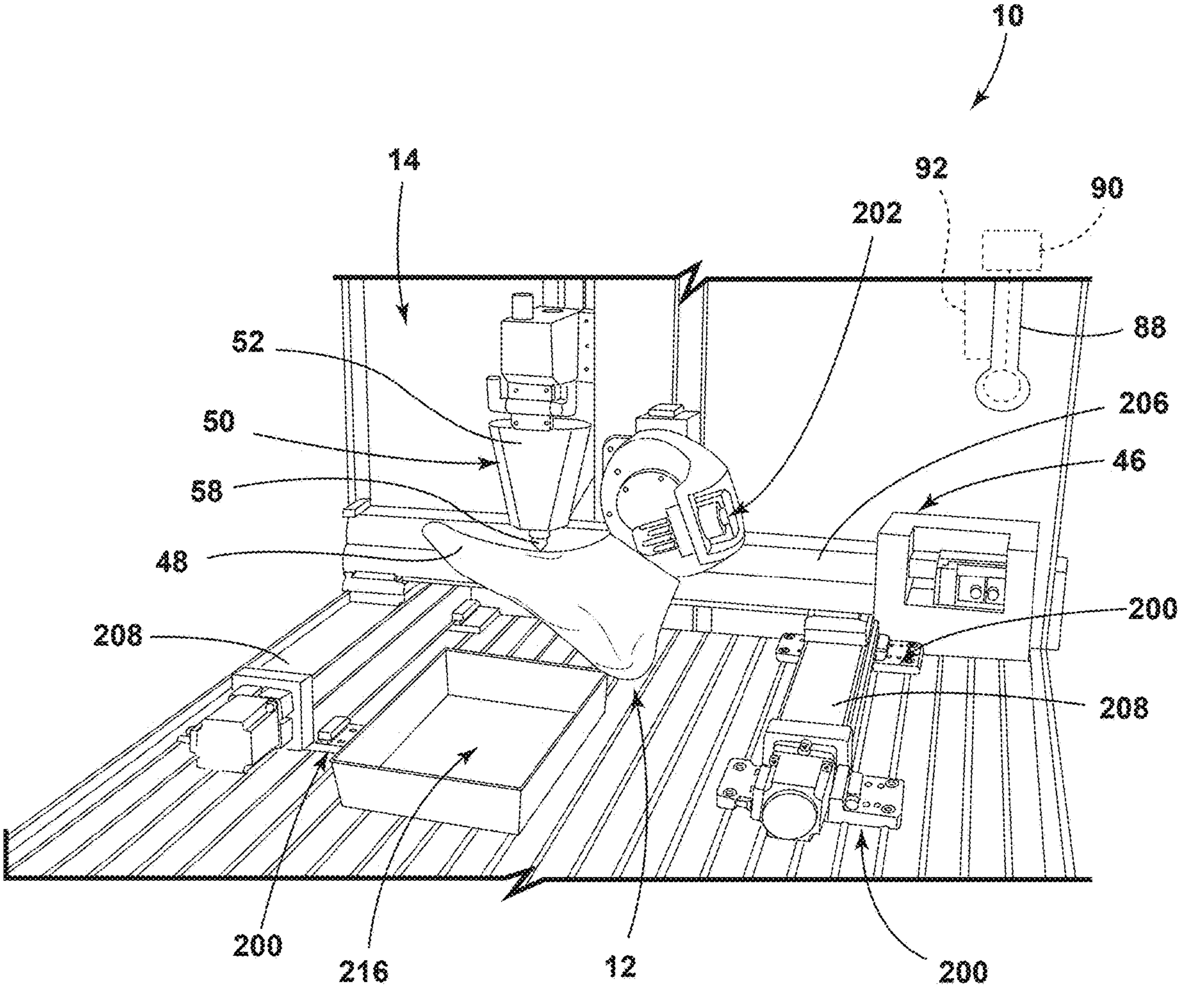
FIG. 14 is a partial perspective view of the additive machine according to example implementations of aspects of the present disclosure.
Figure 15:
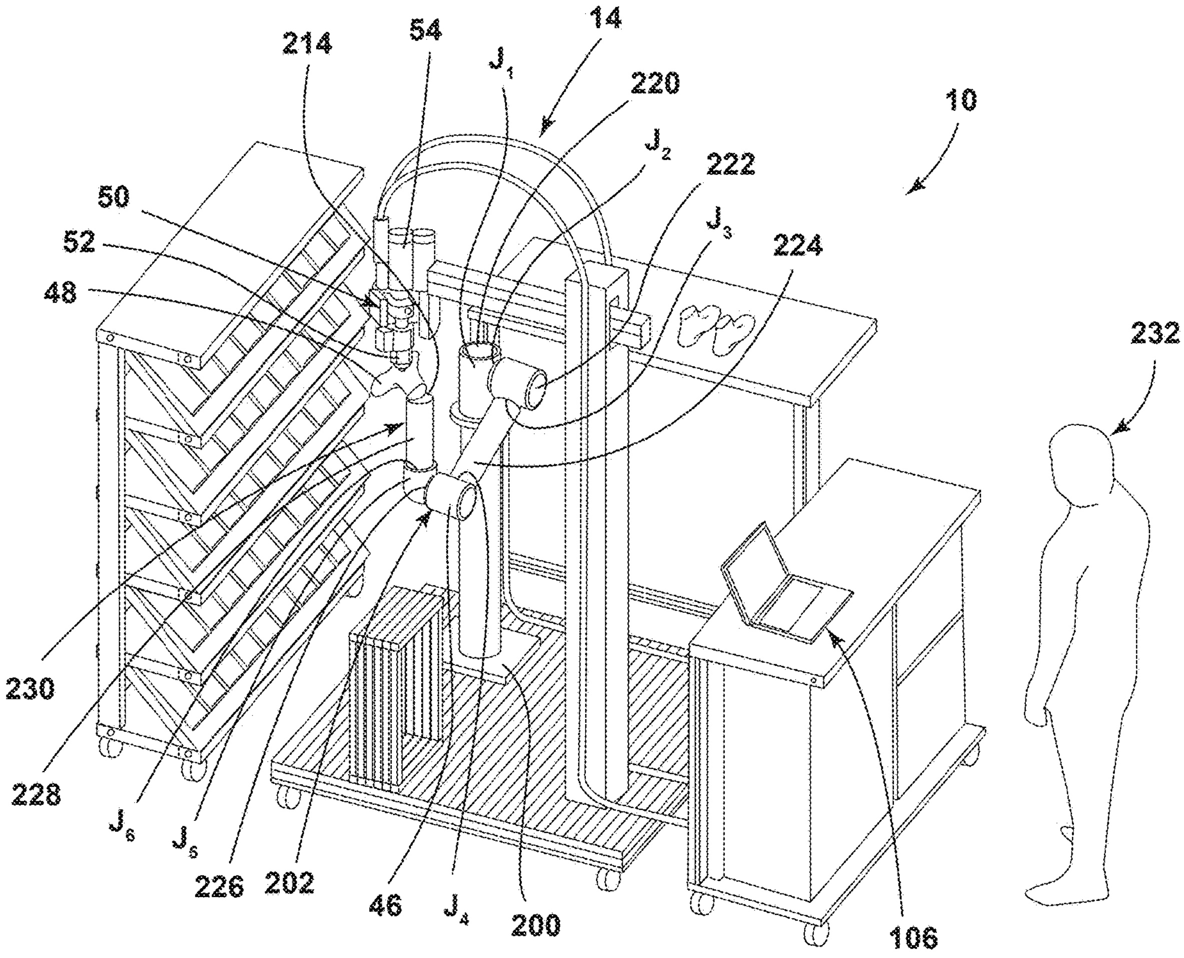
FIG. 15 is a perspective view of the additive machine according to example implementations of aspects of the present disclosure.
Figure 16:
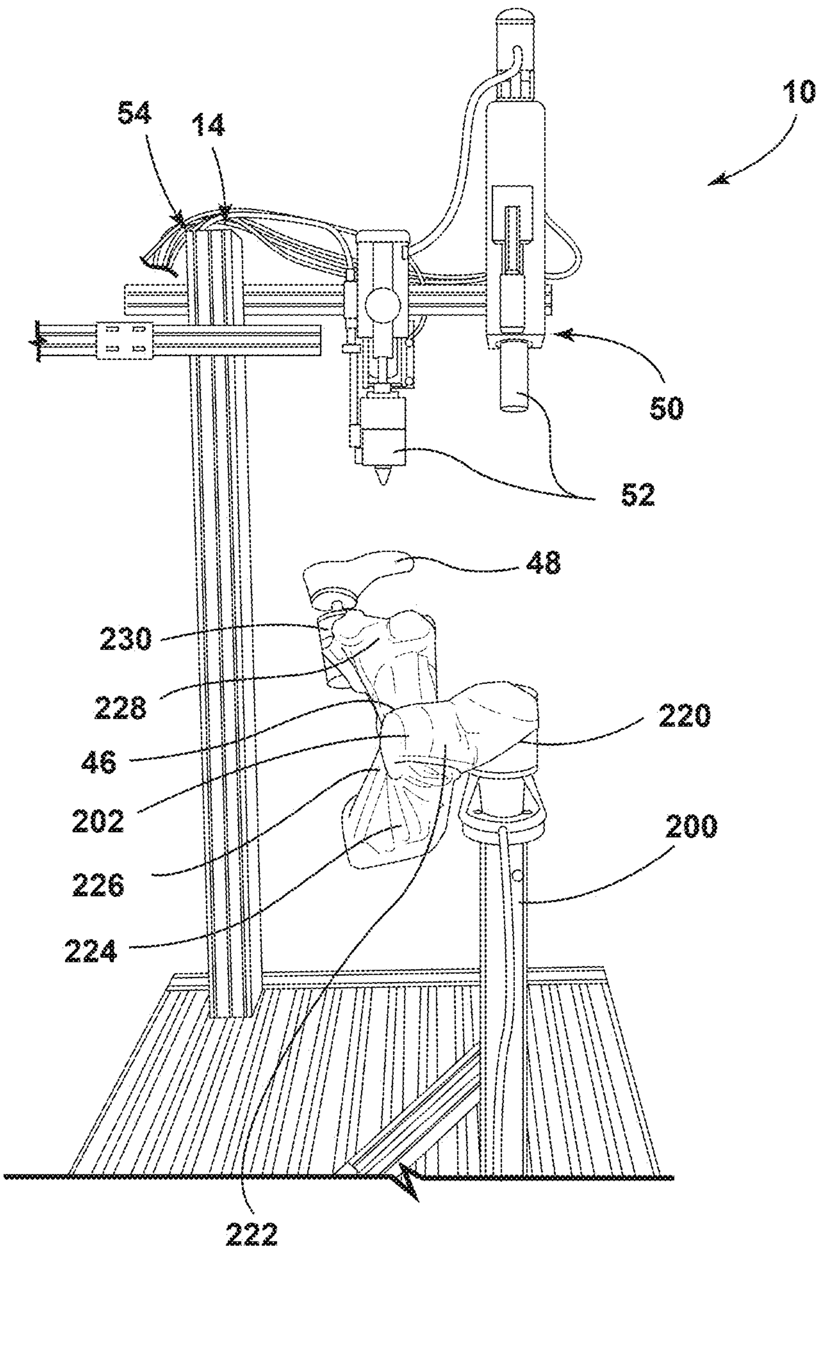
FIG. 16 is a perspective view of the additive machine according to example implementations of aspects of the present disclosure.

With reference to FIGS. 12-16, the additive machine 14 having various components is illustrated with various articulation assemblies each configured to move the end-piece 48 relative to the print head 52 (and/or any other component). As shown in FIGS. 12-14, the additive machine 14 may include an articulation assembly that is configured as a five-axis machine 14. As shown in FIGS. 15 and 16, the additive machine 14 may include an articulation assembly that is configured as a six-axis machine 14. It will be appreciated that the articulation assemblies are described in FIGS. 12-16 are for illustrative purposes and the articulation assembly may include any number of actuators configured to move the end-piece 48 (and/or the print head 52) in any manner without departing from the scope of the present disclosure.

Referring now to FIGS. 12-14, the articulation assembly is illustrated as a multi-axis assembly configured to move along one or more axes and/or about one or more axes. As illustrated, the articulation assembly has a base structure 200 and an arm 202 movably coupled to the base structure 200. The end-piece 48 23 is attached to a distal end portion 204 of the arm 202.

As illustrated, the base structure 200 may be operably coupled with a first actuator 206 of the actuator assembly 78. The first actuator 206 may be configured to move the base along the X-axis. In addition, the first actuator 206 may be operably coupled with one or more second actuators 208 of the actuator assembly 78. The one or more second actuators 208 are configured to move the first actuator 206 and the base along the Y-axis. In cases in which the first actuator 206 is coupled with more than one second actuator 208, the second actuators 208 may include a primary actuator and a secondary actuator. In such instances, the secondary actuator may move the first actuator 206 there long to maintain a generally perpendicular orientation between the first actuator 206 and the one or more second actuators 208.

As illustrated in FIGS. 12-14, the arm 202 may be rotatably coupled with the base about a first joint J1, which may rotate about line 210. Moreover, a second joint J2 may be positioned between the end-piece 48 and the first joint J1, which may rotate about line 212. In various instances, the second joint J2 may be offset from the first joint J1. For instance, the second joint J2 may be transverse to the first joint J1. However, it will be appreciated that the first joint J1, the second joint J2, and any additional joints may be oriented in any manner without departing from the scope of the present disclosure. Each of the joints J1, J2 may include a rotational actuator as a drive source and an encoder for detecting the amount of rotation of the respective rotational actuator, that is, position information of each respective actuator. A control point 214 indicating the position of the arm 202 and serving as a control target is provided at the distal end portion 204 of the arm 202. As the respective rotational actuators of the joints J1, J2, and linear actuators are driven independently of each other, the control point 214 on the arm 202 can be moved along a desired trajectory.

With further reference to FIG. 14, the additive manufacturing system 10 may include a vat 216. The vat 216 may include an additive material 16 therein. In some cases, the additive material 16 may be comprised at least partially of PHA (or any other practical material). By operating the articulation system 46 in a defined path, the article 12, or a portion thereof, may be placed in the vat 216 to form a section of the article 12.

Referring still to FIG. 14, a compressor unit 88 that compresses additive material 16 to alter a characteristic of the article 12 may be positioned within the additive manufacturing system 10. In various examples, the compressor unit 88 may be movable relative to the articulation system 46, the printer head, or any other component of the additive manufacturing system 10. Alternatively, the compressor unit 88 may be generally stationary. In such cases, the articulation system 46 may be configured to move the article 12 to a position of the compressor unit 88 to interact with the compressor unit 88.

In some examples, the compressor unit 88 may be a weighted rod with a rigid or soft pad at a distal end portion. In some cases, the articulation system 46 may be actuated such that the article 12 makes contact with the compressor unit 88 under a specific applied force, optionally with the application of heat (or cooling) from a temperature control system, to allow the additive material 16 to be compressed, and optionally fused or consolidated, thereby altering a characteristic of a defined portion of a shoe as determined by the design. This compression technique can also aid in material section adhesion on the shoe being prepared. Different parts of the shoe or any other article 12 may be compressed to different fiber densities.

Referring now to FIGS. 15 and 16, the articulation assembly is illustrated as a six-axis assembly having six axes of rotational movement. As illustrated, the articulation assembly has a base structure 200 and an arm 202 movably coupled to the base structure 200. The end-piece 48 is attached to a distal end portion 204 of the arm 202.

As illustrated, the arm 202 may be formed of a plurality of arms 220, 222, 224, 226, 228, 230 coupled together in a rotationally movable manner and has six joints J1 to J6. Any of the joints may be configured as bending joints or torsion joints. Each of the joints J1, J2, J3, J4, J5, J6 may include an actuator as a drive source and an encoder for detecting the amount of rotation of the respective actuator, that is, position information of each respective actuator. A control point 214 indicating the position of the arm 202 and serving as a control target is provided at the distal end portion 204 of the arm 202. As the respective actuators of the joints J1, J2, J3, J4, J5, J6 are driven independently of each other, the control point 214 on the arm 202 can be moved along a desired trajectory.

The end-piece 48 may be coupled to the distal end portion 204 of the arm 202. As provided herein, the end-piece 48 may be a shoe last. In various examples, the particular end-piece 48 may be defined by a used in the computing system 80 and/or detected by the computing system 80 without user input. Based on the dimensions of the end-piece 48, the tool path may be varied to accommodate the shape and dimensions of the end-piece 48.

As shown in FIG. 16, the additive machine 14 may further include a first printer head and a second printer head. In various examples, the first printer head and the second printer head may each be controlled by a respective controller, which in turn, may be ultimately controlled by the computing system 80. In the examples illustrated in FIG. 16, the first printer head and the second printer head each deliver additive material 16 to a shoe in production, but it is to be understood that there may be any number of printer heads, such as one, two, three, four, or more printer heads. Each printer head may be functionally linked to material handling equipment such as material hoppers, heated manifolds, spray nozzles, and air stream delivery lines with exhaust ports. The manifold and air stream delivery systems may be independent or combined in a unique way to allow for the extrusion of different types and thicknesses of non-woven additive material 16 (such as a thermoplastic resin or fiber material). For example, a melt blow extruder may focus multiple nozzles 58 to a single point (radial area), which allows, in combination with the motion control of the articulation assembly, the application of the extruded fibers in varying densities, thicknesses, and geometries on the end-effector 48 according to a defined computational design.

Depending on the manufacturing step, the printer heads may operate simultaneously to extrude additive material 16 (e.g., polymer fiber) onto the end-effector 48. At other times, the printer heads may operate singly or sequentially to deposit the additive material 16 on the end-effector 48, for example, if only one type of extruded fiber is needed during a given step of the manufacturing process. In various examples, one of the printer heads may be a melt-blowing extruder, and another printer head may be a fused deposition modeling (FDM) extruder. The melt-blowing extruder may be configured to reach all areas of the end-effector 48 which is attached to the articulation assembly and to deposit a solid additive material 16 extrusion to create a thick sole and reinforcement areas of the shoe. The fused deposition modeling extruder may be configured to deposit finer fiber around the end-effector 48, which may be used to form the upper, heel counter, and tongue, for example, for cushioning or softness. In several examples, the printer heads may be mounted to the actuators, which control the height of the printer heads in relation to the articulation assembly.

FIG. 15 also shows an operator 232 who may monitor the manufacturing process, oversee operations, and troubleshoot as necessary. The manufacturing system may also include stock materials bins for storage of raw materials or components and one or more molds for manufacturing the structural elements of a shoe. These items as well as other components of the manufacturing system are under the control of the computer system and therefore are brought into use as needed during the manufacture of a shoe.

It will be appreciated that the configuration of the articulation assembly is not particularly limited. For example, the articulation assembly may be a SCARA robot (horizontal articulated robot), a dual-arm robot, or the like. The articulation assembly may be fixed to a floor or the like and thus immovable, or may be fixed to a moving device such as an automated guided vehicle (AGV) and thus movable.

Referring now to FIGS. 17A-23B, as provided herein, the article 12 may be formed through one or more sections. Each section may be formed through an additive process. For instance, the various additive processes may include non-planar additive deposition, multi-filament extrusion, multi-filament texture deposition, high-fidelity melt-blowing, spun deposition, dipping, welding/bonding, pressing/densifying, and/or any other additive process. Each process, when used with a common additive material 16, may generate varied characteristics. It will be appreciated that any additive machine 14 may implement any or all of the additive processes set forth herein in any order.

Figure 17A:
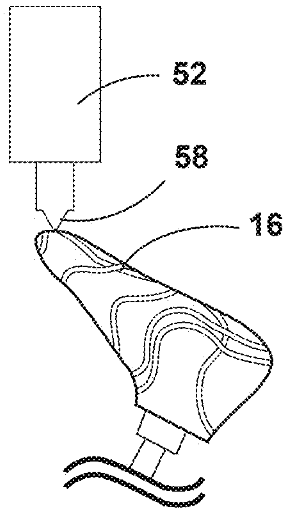
FIG. 17A is a schematic view of an additive process according to example implementations of aspects of the present disclosure.
Figure 17B:
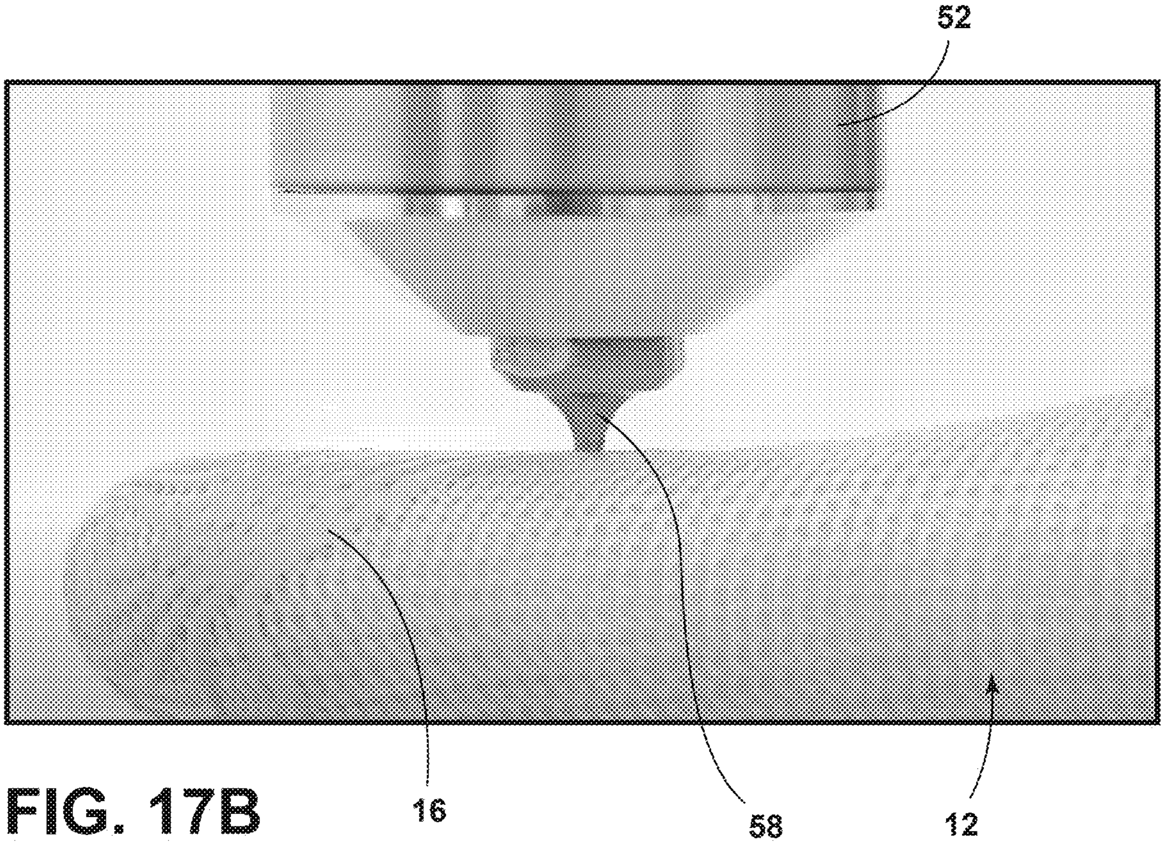
FIG. 17B is a perspective view of the print head and the article during the additive process of FIG. 17A according to example implementations of aspects of the present disclosure.

Referring further to FIGS. 17A and 17B, the additive process may be implemented as a non-planar additive deposition to form a section of the article 12. In such instances, a road of additive material 16 is applied to a three-dimensional surface, which may be the end-piece 48, a base substrate for the article 12, and/or a previously disposed section of the additive material 16. In various examples, the road formed during a non-planar additive deposition may be disposed in a three-dimensional manner to form the article 12. In such instances, the deposition of the additive material 16 may be placed on a complex surface, which may include one or more of a convex surface, a concave surface, and/or a hyperbolic surface. In some cases, during non-planar additive deposition, the nozzle 58 may be placed a first distance from the end-piece 48, a base substrate for the article 12, and/or a previously disposed section of the additive material 16. Moreover, the additive material 16 between the nozzle 58 and the end-piece 48, a base substrate for the article 12, and/or a previously disposed section of the additive material 16 may be of a first thickness.

Figure 18A:
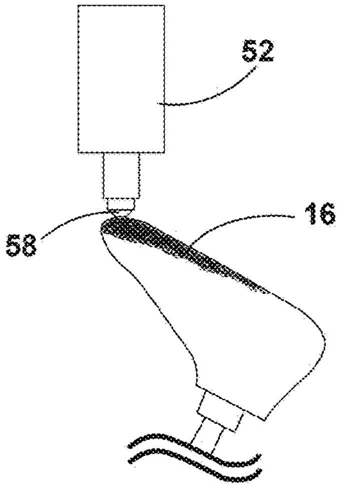
FIG. 18A is a schematic view of an additive process according to example implementations of aspects of the present disclosure.
Figure 18B:
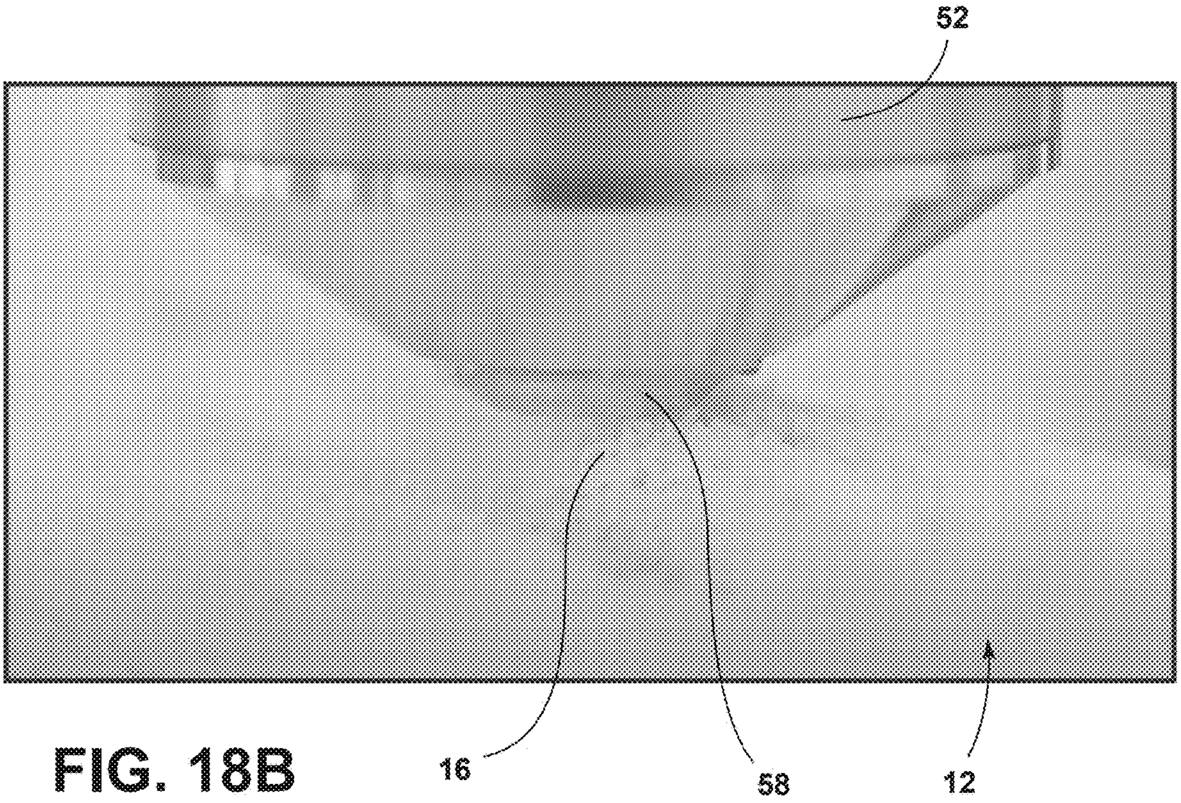
FIG. 18B is a perspective view of the print head and the article during the additive process of FIG. 18A according to example implementations of aspects of the present disclosure.

Referring further to FIGS. 18A and 18B, the additive process may be implemented as a multi-filament extrusion to form a section of the article 12. In such instances, multiple roads of additive material 16 are applied to a three-dimensional surface, which may be the end-piece 48, a base substrate for the article 12, and/or a previously disposed section of the additive material 16 through a nozzle 58 defining multiple orifices 60 simultaneously along a common pass of the end-piece 48 along the nozzle 58. For instance, the nozzle may define two to five hundred (or any other number) of orifices 60. Moreover, each of the orifices 60 may have any practicable width, such as a width of 0.1 mm to 2 mm. The additive material 16 may be extruded through multiple orifices 60 to form a three-dimensional structure that may perform similarly to foam by having overlapping and non-parallel roads of additive material 16 that define voids in between the individual roads. In this process, each road may be coiling in an instable state 'randomly' attaching to other filaments close by creating voids and air pockets within the additive material 16 applied. In some cases, the extrusion outlet orifices 60 are arranged in a concentric pattern. However, for different geometries, the arrangement of nozzle orifices 60 can vary. Moreover, the cross-sectional geometry of the orifices 60 may be of any shape, e.g. rectangular, triangular, etc. to obtain the defined characteristics.

In some cases, during multi-filament extrusion, the nozzle 58 may be placed a second distance from the end-piece 48, a base substrate for the article 12, and/or a previously disposed section of the additive material 16. The second distance may be larger than the first distance. However, in other examples, the second distance may be equal to the first distance, and/or the second distance may be less than the first distance. Moreover, each filament of the additive material 16 between the nozzle 58 and the end-piece 48, a base substrate for the article 12, and/or a previously disposed section of the additive material 16 may be of a second thickness. Alternatively, the filaments simultaneously extruded from the nozzle 58 may be of varied thicknesses relative to one another. In some instances, the second thickness may be less than the first thickness. However, in other examples, the second thickness may be equal to the first thickness, and/or the second thickness may be less than the first thickness.

In various examples, the density of the resulting section can be controlled by controlling the temperature of the additive material 16. For example, in some instances, by maintaining the additive material 16 temperature in the range of 80 degrees Celsius (C) up to 300 degrees C. By adjusting the temperature of the additive material 16, the additive material 16 may fall in as well as adhere to adjacent additive material 16 in a varied manner. In addition, the density of the multi-filament section can also be varied during the application across the lengths of the extruded paths, enabling local density variation. As such, multi-filament extrusion may provide a way to achieve foam-like and three-dimensionally controlled structures, which can be digitally designed (programmed) and can be used to provide cushioning, padding, as well as solid parts.

In some examples, the roads formed by the non-planar additive deposition may have one or more characteristics that is varied from the roads formed during a multi-filament extrusion. For instance, the roads formed during a multi-filament extrusion may have a smaller thickness than the road formed during the non-planar additive deposition. Moreover, the road formed during the non-planar additive deposition may be generally attached to the end-piece 48, a base substrate for the article 12, and/or a previously disposed section of the additive material 16 with no to few gaps therebetween. Conversely, the roads formed during a multi-filament extrusion may include many gaps therebetween, leading to a varied aesthetic look and a varied compression level for the section formed through multi-filament extrusion.

In some examples, during multi-filament extrusion, the nozzle 58 may contact the additive material 16, as shown in FIG. 18B, as the additive material 16 is contacting the end-piece 48, a base substrate for the article 12, and/or a previously disposed section of the additive material 16. In such examples, due to the nozzle 58 being of a higher temperature than the additive material 16, the nozzle 58 may melt a portion of the additive material 16.

Figure 19A:
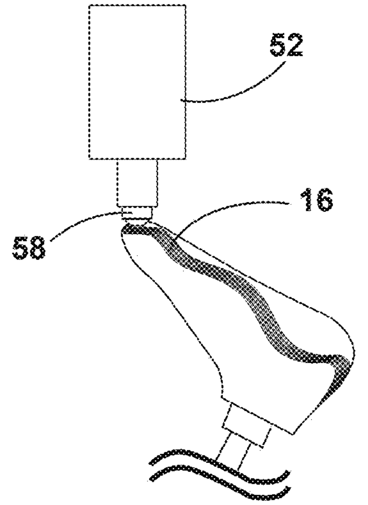
FIG. 19A is a schematic view of an additive process according to example implementations of aspects of the present disclosure.
Figure 19B:
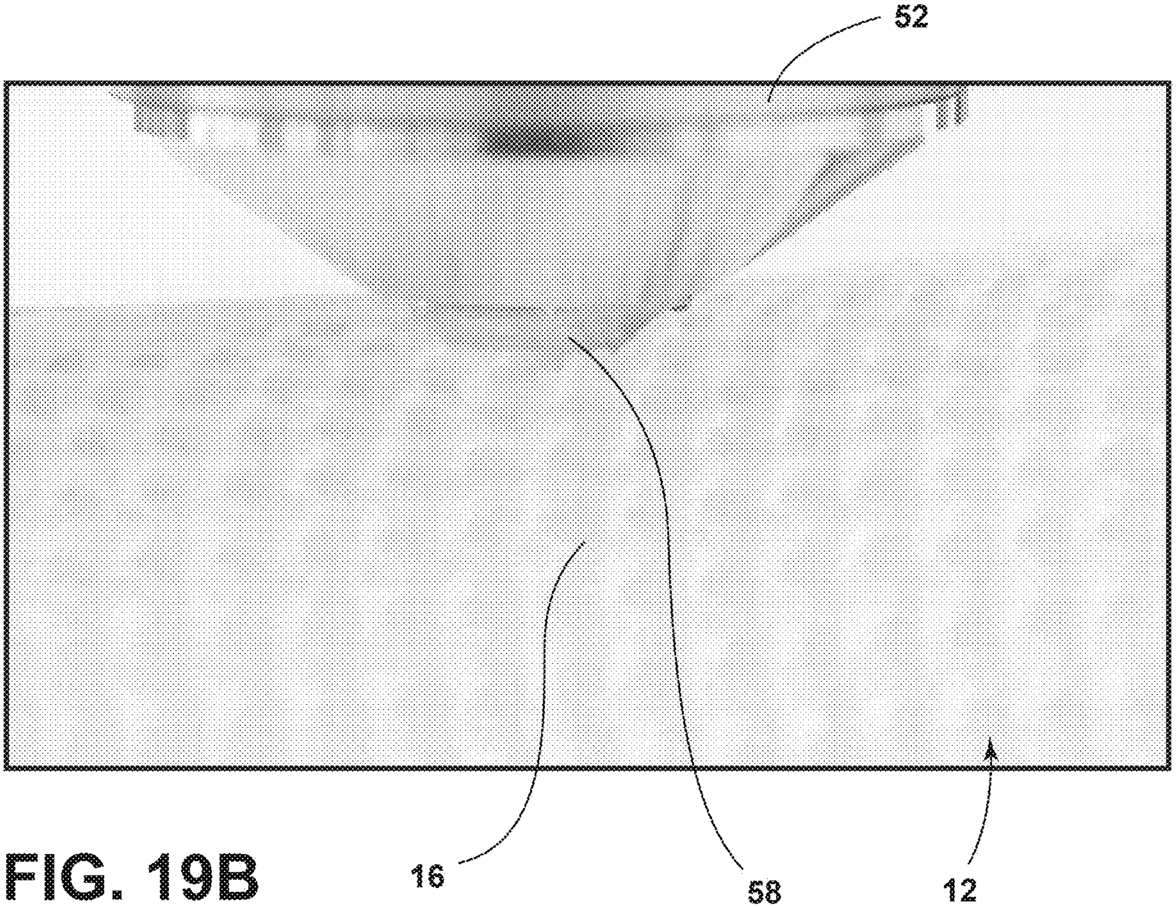
FIG. 19B is a perspective view of the print head and the article during the additive process of FIG. 19A according to example implementations of aspects of the present disclosure.

Referring further to FIGS. 19A and 19B, the additive process may be implemented as multifilament texture deposition to form a section of the article 12. In such instances, the nozzle 58 of the print head 52 may include more than one orifice 60 for which the additive material 16 is extruded to form multiple roads orifices 60 simultaneously along a common pass of the end-piece 48 along the nozzle 58. However, the nozzle 58 is placed at a closer distance to the to be formed section of the article 12 than with the multi-filament extrusion process. In such instances, multiple roads of additive material 16 are applied to a three-dimensional surface, which may be the end-piece 48, a base substrate for the article 12, and/or a previously disposed section of the additive material 16. In such instances, gaps between the multiple roads are formed. The gaps and the additive material 16, in conjunction with one another, may form controlled instabilities in the form of loops and aggregation of material with defined gaps between the roads. Thus, the multiple roads formed within this section may have a varied compression level, or other characteristic, from the remaining sections of the article 12.

In some examples, the road formed by the non-planar additive deposition may have one or more characteristics that is varied from the roads formed during a multi-filament extrusion. For instance, the roads formed during a multi-filament extrusion may have a smaller thickness than the road formed during the non-planar additive deposition. Moreover, the road formed during the non-planar additive deposition may be generally attached to the end-piece 48, a base substrate for the article 12, and/or a previously disposed section of the additive material 16 with no to few gaps therebetween. Conversely, the roads formed during a multi-filament extrusion may include many gaps therebetween, leading to a varied aesthetic look and a varied compression level for the section formed through multi-filament extrusion.

In some cases, during multifilament texture deposition, the nozzle 58 may be placed a third distance from the end-piece 48, the base substrate for the article 12, and/or the previously disposed section of the additive material 16. The third distance may be less than the second distance. However, in other examples, the third distance may be equal to the second distance, and/or the third distance may be less than the second distance. Moreover, each filament of the additive material 16 between the nozzle 58 and the end-piece 48, a base substrate for the article 12, and/or a previously disposed section of the additive material 16 may be of a third thickness. Alternatively, the filaments simultaneously extruded from the nozzle 58 may be of varied thicknesses relative to one another. In some instances, the third thickness may be equal to the second thickness. However, in other examples, the third thickness may be less than the second thickness, and/or the third thickness may be greater than the second thickness.

Figure 20A:
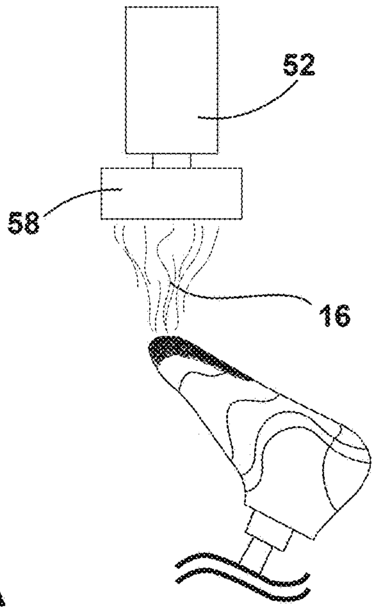
FIG. 20A is a schematic view of an additive process according to example implementations of aspects of the present disclosure.
Figure 20B:
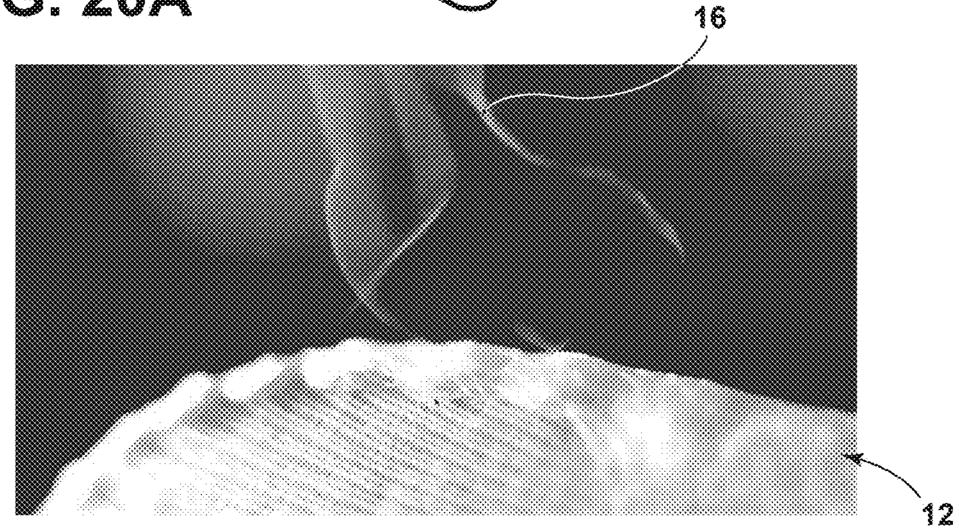
FIG. 20B is a perspective view of an additive material and the article during the additive process of FIG. 20A according to example implementations of aspects of the present disclosure.
Figure 20C:
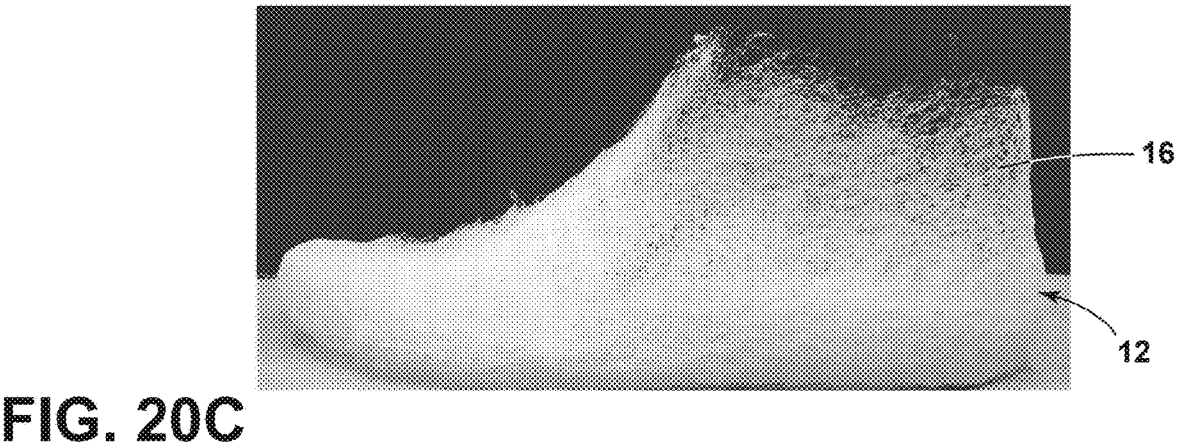
FIG. 20C is a perspective view of the article formed from the additive process of FIG. 20A according to example implementations of aspects of the present disclosure.

Referring further to FIGS. 20A-20C, the additive process may be implemented as high-fidelity melt-blowing to form a section of the article 12. In such instances, one or more nozzles 58 may extrude additive material 16 while one or more blowers 70 blow the additive material 16 toward a defined location simultaneously along a common pass of the end-piece 48 along the nozzle 58. In cases in which more than one nozzle 58 is used, each of the nozzles 58 may be configured to generally point towards a commonly defined location. In various instances, the section of the article 12 formed by the additive material 16 that is to be disposed may be moved closer or farther from the nozzles 58 to form various densities within the section.

In some cases, during high-fidelity melt-blowing, the nozzle 58 may be placed a fourth distance from the end-piece 48, the base substrate for the article 12, and/or the previously disposed section of the additive material 16. The fourth distance may be greater than the first distance and/or the third distance. However, in other examples, the fourth distance may be equal to the first distance and/or the third distance, and/or the fourth distance may be less than the first distance and/or the third distance. Moreover, each filament of the additive material 16 between the nozzle 58 and the end-piece 48, a base substrate for the article 12, and/or a previously disposed section of the additive material 16 may be of a fourth thickness. Alternatively, the filaments simultaneously extruded from the nozzle 58 may be of varied thicknesses relative to one another. In some instances, the fourth thickness may be equal to the first thickness, the second thickness, and/or the third thickness. However, in other examples, the fourth thickness may be less than the first thickness, the second thickness, and/or the third thickness, and/or the fourth thickness may be greater than the first thickness, the second thickness, and/or the third thickness.

Figure 21A:
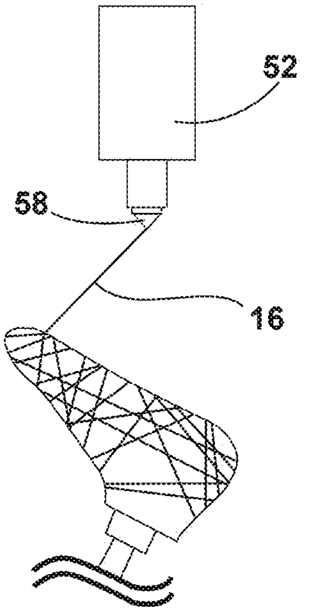
FIG. 21A is a schematic view of an additive process according to example implementations of aspects of the present disclosure.
Figure 21B:
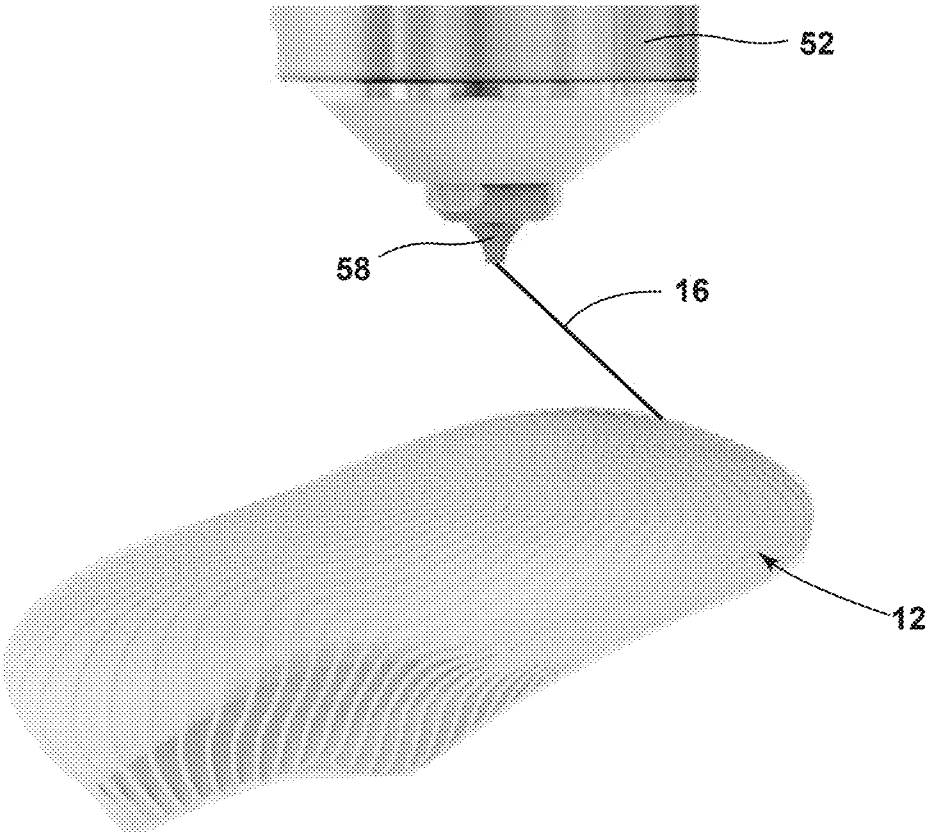
FIG. 21B is a perspective view of the print head and the article during the additive process of FIG. 21A according to example implementations of aspects of the present disclosure.

Referring further to FIGS. 21A and 21B, the additive process may be implemented as a spun deposition to form a section of the article 12. In such instances, the additive material 16 may be maintained at a lower temperature relative to the non-planar additive deposition. Moreover, the additive material 16 may be stretched between the nozzle 58 and the article 12 such that the additive material 16 has a portion between the article 12 and the nozzle 58 having a width that is less than the width of the nozzle 58.

In some cases, during high-fidelity melt-blowing, the nozzle 58 may be placed a fifth distance from the end-piece 48, the base substrate for the article 12, and/or the previously disposed section of the additive material 16. The fifth distance may be greater than the first distance, the second distance, the third distance, and/or the fourth distance. However, in other examples, the fifth distance may be equal to the first distance, the second distance, the third distance, and/or the fourth distance. Alternatively, the fifth distance may be less than the first distance, the second distance, the third distance, and/or the fourth distance. Moreover, the filament of the additive material 16 between the nozzle 58 and the end-piece 48, a base substrate for the article 12, and/or a previously disposed section of the additive material 16 may be of a fifth thickness. In some instances, the fifth thickness may be equal to the first distance, the second distance, the third distance, and/or the fourth distance. However, in other examples, the fifth thickness may be less than the first distance, the second distance, the third distance, and/or the fourth distance. Alternatively, the fifth thickness may be greater than the first distance, the second distance, the third distance, and/or the fourth distance.

Figure 22A:
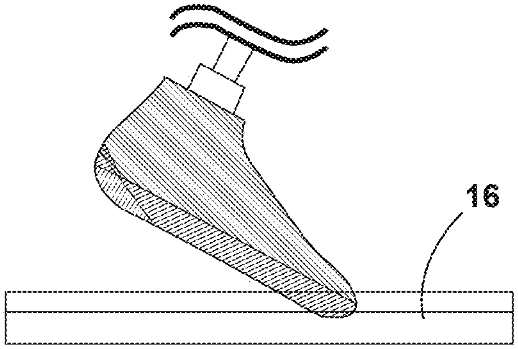
FIG. 22A is a schematic view of an additive process according to example implementations of aspects of the present disclosure.
Figure 22B:
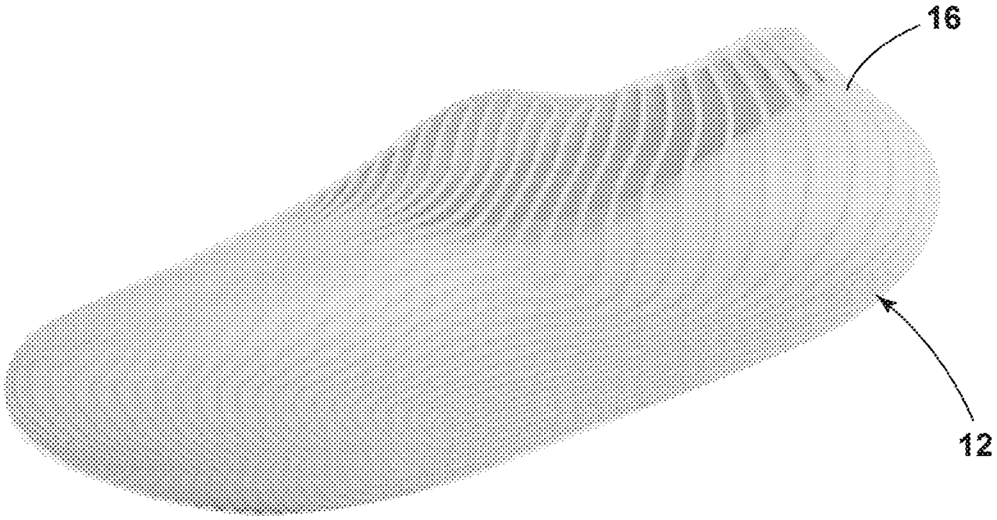
FIG. 22B is a perspective view of the print head and the article during the additive process of FIG. 22A according to example implementations of aspects of the present disclosure.

Referring further to FIGS. 22A and 22B, the additive process may be implemented as dipping to form a section of the article 12. In such instances, a section of the article 12 may be positioned within a vat 216. In various examples, the material within the vat 216 may be common with the additive material 16 extruded from the one or more nozzles 58 of the additive machine 14. Alternatively, the composition of the material within the vat 216 may be varied from the extruded additive material 16.

As shown in FIG. 22B, the section of the article 12 that is dipped within the vat 216 may have non-linear sections from a heel-to-toe of the shoe and/or along any other linear direction from one portion of the shoe to another portion of the shoe.

Figure 23A:
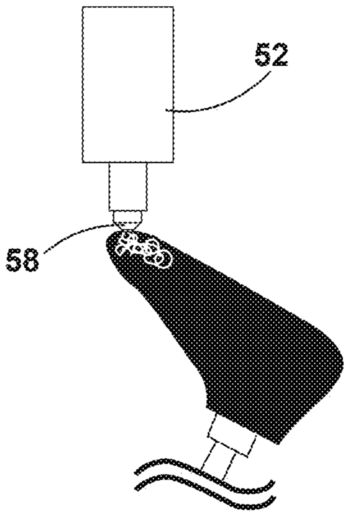
FIG. 23A is a schematic view of an additive process according to example implementations of aspects of the present disclosure.

Referring further to FIG. 23A, the additive process may be implemented as welding and/or bonding to form a section of the article 12. In such instances, a defined section of the article 12 may be heated by the nozzle 58 and/or any other component of the additive manufacturing system 10 to alter one or more characteristics of the article 12. The temperature alteration of the article 12 may affect one or more characteristics of the article 12.

Figure 23B:
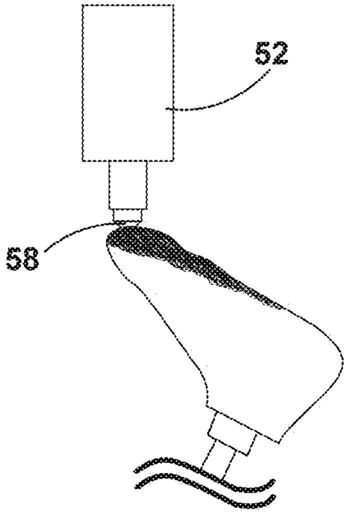
FIG. 23B is a schematic view of an additive process according to example implementations of aspects of the present disclosure.

Referring further to FIG. 23B, the additive process may be implemented as pressing and/or densifying to form a section of the article 12. In such instances, the article 12 may be pressed or otherwise in contact with a nozzle 58 and/or a compressor unit 88 to densify or otherwise alter a characteristic of the article 12. The mechanical alteration of the article 12 may affect one or more characteristics of the article 12.

Figure 24:
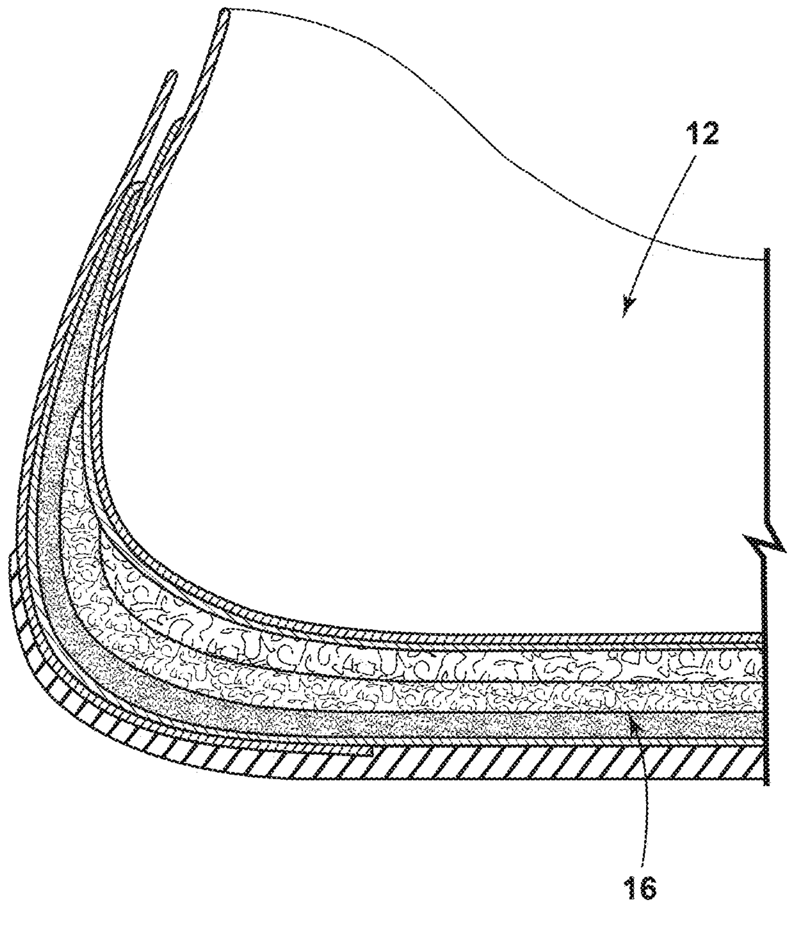
FIG. 24 is an example partial cross-sectional view of the article according to example implementations of aspects of the present disclosure.

With reference to FIG. 24, an example cross section of a section of the article 12 is shown. As shown, the article 12 includes a plurality of sections, which may be layered upon one another. As discussed herein, each layer may be formed through an additive process thereby leading to varied characteristics between at least some one of the layers. However, one or more, including all of the sections, may be formed from a common additive material 16. As provided herein, the additive material 16 includes biodegradable or bio-derived content. In some cases, the resin may comprise at least 90% biodegradable content. Further, the additive material 16 is a polyhydroxyalkanoate (PHA), polyhydroxybutyrate (PHBV), poly(3-hydroxybutyrate-4-hydroxybutyrate) (P3HB4HB), or a blend thereof.

Figure 25:
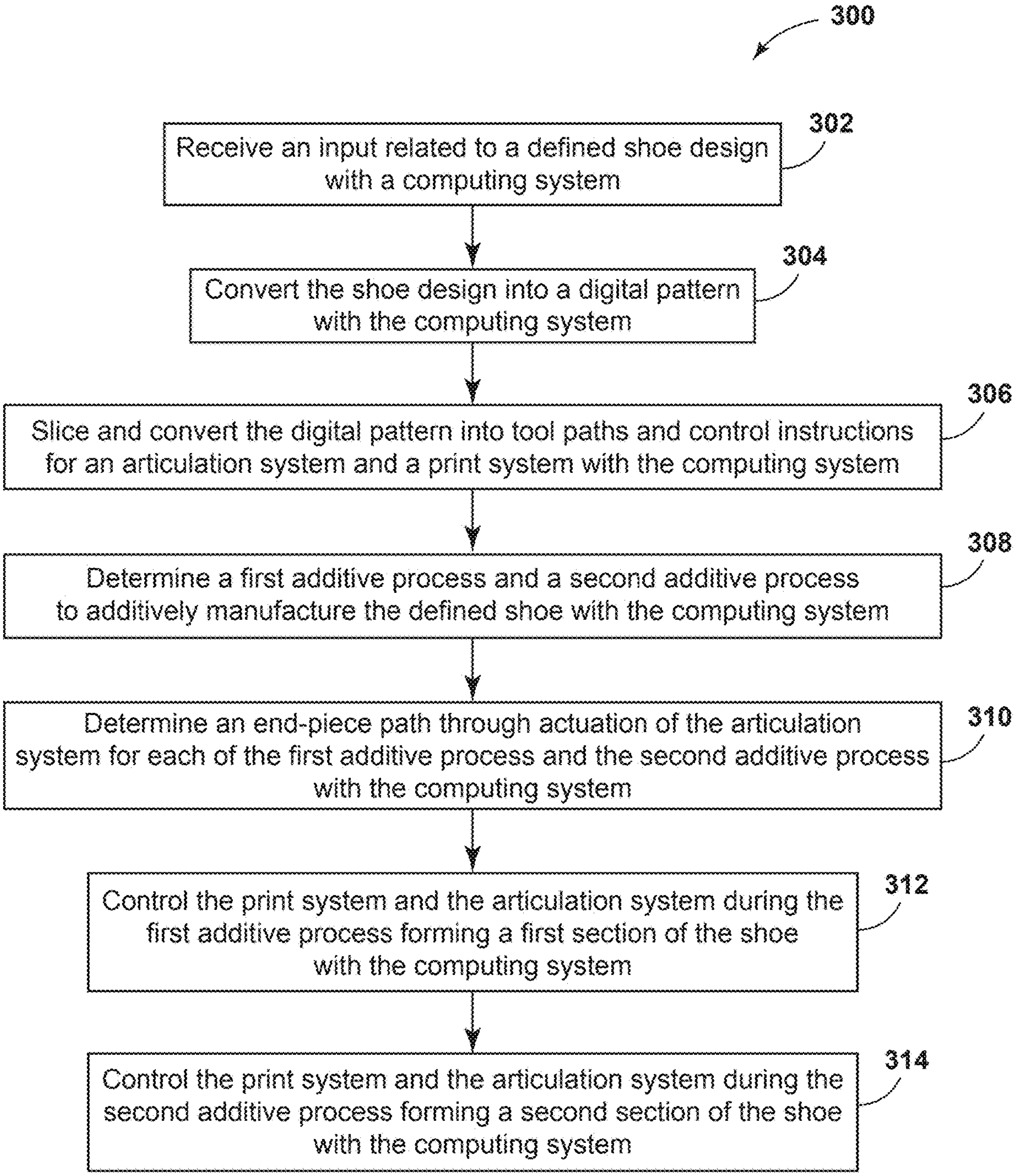
FIG. 25 is a flow diagram of a method for manufacturing a shoe according to example implementations of aspects of the present disclosure.
Figure 26:
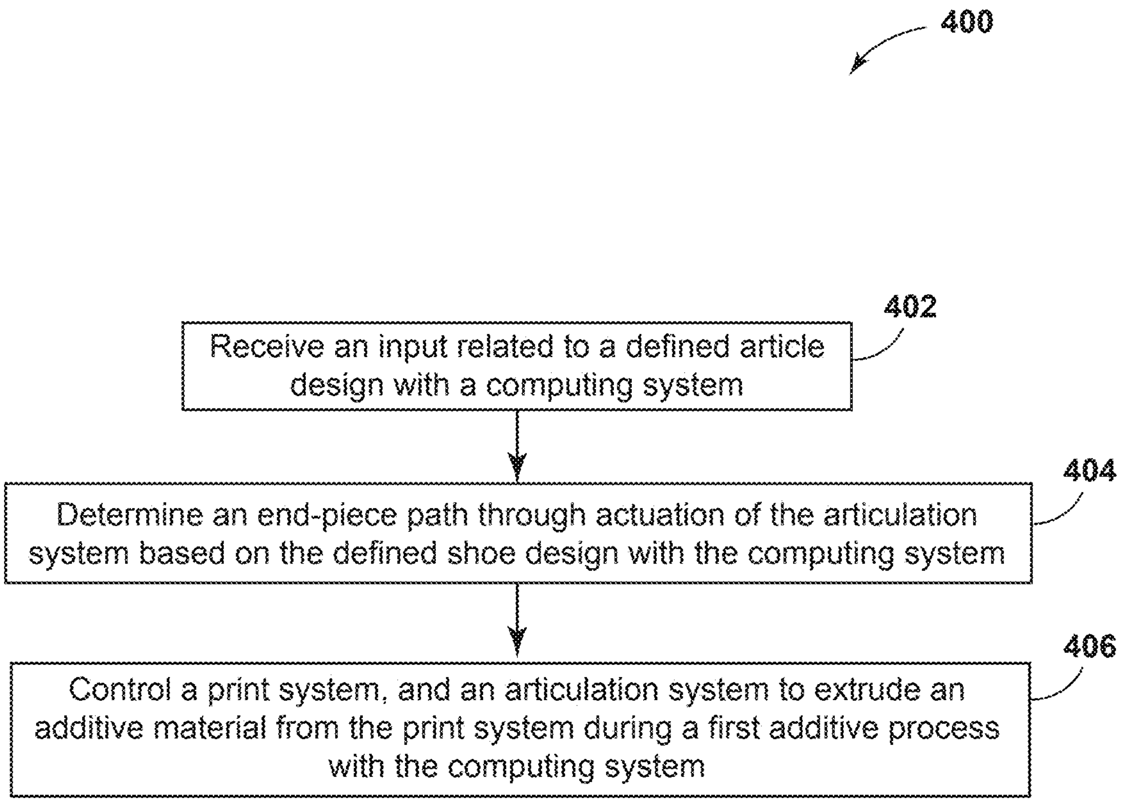
FIG. 26 is a flow diagram of a method for manufacturing an article according to example implementations of aspects of the present disclosure.

Referring now to FIGS. 25 and 26, flow diagrams of a methods 300, 400 for manufacturing a shoe and for manufacturing an article are respectively illustrated in accordance with aspects of the present subject matter. In general, the methods 300, 400 will be described herein with reference to the components described in FIGS. 1A-24. However, it will be appreciated that the disclosed methods 300, 400 may be implemented with machines having any other suitable configurations and/or within systems having any other suitable system configuration. In addition, although FIGS. 25 and 26 depict steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in various ways without deviating from the scope of the present disclosure.

As illustrated in FIG. 25, at (302), the method 300 may include receiving an input related to a defined shoe design with a computing system. At (304), the method 300 may include converting the shoe design into a digital pattern with the computing system. Further, at (306), the method 300 can include slicing and converting the digital pattern into an end-piece path and control instructions for an articulation system and a print system with the computing system.

At (308), the method 300 may include determining a first additive process and a second additive process to additively manufacture the defined shoe. In addition, at (310), the method 300 may include determining an end-piece path through the actuation of the articulation system for each of the first additive process and the second additive process with the computing system.

At (312), the method 300 may include controlling the print system and the articulation system during the first additive process forming a first section of the shoe with the computing system. At (314), the method 300 may include controlling the print system and the articulation system during the second additive process forming a second section of the shoe with the computing system.

In some cases, the additive material is used to form the upper, insole, midsole, and outsole of the shoe. Moreover, the first additive process and the second additive process use a common additive material. In various instances, the additive material includes biodegradable or bio-derived content. For instance, the additive material is a polyhydroxyalkanoate (PHA), polyhydroxybutyrate (PHBV), poly(3-hydroxybutyrate-4-hydroxybutyrate) (P3HB4HB), or a blend thereof.

As provided herein, the first additive process is one of non-planar additive deposition, multi-filament extrusion, multifilament texture deposition, high-fidelity melt-blowing, spun deposition, dipping, welding, or pressing. Similarly, the second additive process is one of non-planar additive deposition, multi-filament extrusion, multifilament texture deposition, high-fidelity melt-blowing, spun deposition, dipping, welding, or pressing.

As illustrated in FIG. 26, at (402), the method 400 may include receiving an input related to a defined article design with a computing system. At (404), the method 400 may include determining an end-piece path through actuation of the articulation system based on the defined shoe design with the computing system. At (406), the method 400 may include controlling a print system, and an articulation system to extrude an additive material from the print system during a first additive process with the computing system. In some instances, the first additive process comprises extruding multiple filaments of additive material simultaneously through the first nozzle.

In some cases, extruding multiple filaments of additive material simultaneously through the first nozzle may further include disposing the multiple filaments on one another during a common pass of the end-piece along the first nozzle to define gaps between the multiple filaments. Additionally or alternatively, extruding multiple filaments of additive material simultaneously through the first nozzle may further include disposing the multiple filaments adjacently to one another during a common pass of the end-piece along the first nozzle to define no gaps between the multiple filaments and a substrate upon which the multiple filaments are disposed. Additionally or alternatively, extruding multiple filaments of additive material simultaneously through the first nozzle may further include operating a blower configured to blow the multiple filaments towards a defined location.

Moreover, the additive material includes biodegradable or bio-derived content. For example, the additive material is a polyhydroxyalkanoate (PHA), polyhydroxybutyrate (PHBV), poly(3-hydroxybutyrate-4-hydroxybutyrate) (P3HB4HB), or a blend thereof.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude the inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude the inclusion of such modifications, variations, or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of," "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. An additive manufacturing system comprising:
- an articulation system comprising:
  - an actuator assembly;
  - a base operably coupled with the actuator assembly; and
  - an arm rotatable relative to the base;
- an end-piece operably coupled with a distal end portion of the arm, the end-piece rotatable relative to the arm, wherein the end-piece defines a shoe last;
- a print system configured to extrude an additive material towards the end-piece, the print system including a first nozzle having a plurality of orifices arranged in a concentric pattern; and
- a computing system including one or more processors and one or more non-transitory computer-readable media that collectively store instructions that, when executed by the one or more processors, configure the computing system to:
  - receive an input related to a defined design of an article;
  - determine an end-piece path through actuation of the articulation system based on the defined design; and
  - control the print system and the articulation system to extrude the additive material from the print system during a first additive process, wherein the first additive process comprises extruding multiple filaments of the additive material simultaneously through the first nozzle to form non-parallel, individual roads on the article that define voids in between the individual roads to form loops of material external of the first nozzle, wherein the individual roads randomly attach to other filaments during a common pass of the rotating shoe last, wherein the loops of material define voids defined by the additive material, and wherein the individual roads extruded from the first nozzle are of varied thicknesses relative to one another and the first nozzle is placed at varied distances from the rotating shoe last during the common pass.

2. The additive manufacturing system of claim 1, wherein the multiple filaments of the additive material are disposed on one another during the common pass of the end-piece along the first nozzle to form a varied compression level from at least one other section of the article.

3. The additive manufacturing system of claim 1, wherein the print system further comprises:
- a blower configured to blow the additive material toward a defined location.

4. The additive manufacturing system of claim 3, wherein the print system further comprises:
- a second nozzle having a plurality of orifices, wherein the first nozzle and the second nozzle are directed towards a common defined location.

5. The additive manufacturing system of claim 1, wherein the print system further comprises:
- a probe configured to capture data indicative of a position of the first nozzle relative to the end-piece.

6. The additive manufacturing system of claim 5, wherein the first nozzle and the probe are movable with one another along a Z-axis.

7. The additive manufacturing system of claim 1, further comprising:
- a compressor unit positioned within a working envelope of the articulation system, the compressor unit configured to alter a characteristic of the article based on contact between the compressor unit and the article.

8. The additive manufacturing system of claim 1, wherein the actuator assembly further comprises:
- a first actuator configured to translate the base along an X-axis direction.

9. The additive manufacturing system of claim 8, wherein the actuator assembly further comprises:
- a second actuator configured to translate the first actuator and the base along a Y-axis direction.

10. The additive manufacturing system of claim 1, wherein the actuator assembly further comprises:
- a first torsion joint configured to allow rotational movement between the base and the arm.

11. The additive manufacturing system of claim 10, wherein the actuator assembly further comprises:
- a second torsion joint configured to allow rotational movement between the arm and the end-piece.

12. The additive manufacturing system of claim 1, wherein the additive material includes biodegradable or bio-derived content.

13. The additive manufacturing system of claim 1, wherein the additive material includes a polyhydroxyalkanoate (PHA) or a blend thereof.

14. The additive manufacturing system of claim 1, wherein the additive material includes a polyhydroxybutyrate (PHBV) or a blend thereof.

15. The additive manufacturing system of claim 1, wherein the additive material includes a poly(3-hydroxybutyrate-4-hydroxybutyrate) (P3HB4HB) or a blend thereof.

16. The additive manufacturing system of claim 1, wherein the articulation system is configured as a five-axis machine.

17. The additive manufacturing system of claim 1, wherein the articulation system is configured as a six-axis machine.

18. An additive manufacturing system comprising:

a print system configured to extrude an additive material towards an end-piece, the print system including a first nozzle having a plurality of orifices, the plurality of orifices including at least a first orifice and a second orifice, the first orifice both laterally and vertically offset from the second orifice, the print system further including an adjustment actuator configured to alter a position of the first nozzle relative to the endpiece;

a compressor unit within a working envelope of the print system and remote from the adjustment actuator, wherein the first nozzle is movable via the adjustment actuator relative to the compressor unit; and a computing system including one or more processors and one or more non-transitory computer-readable media that collectively store instructions that, when executed by the one or more processors, configure the computing system to:

determine an end-piece path through actuation of an articulation system based on a defined design of an article;

control the print system to extrude the additive material from the print system during a first additive process, wherein the first additive process comprises extruding multiple filaments of the additive material simultaneously through the first nozzle along a common pass of the end-piece along the first nozzle, wherein the multiple filaments are extruded with varied thicknesses relative to one another and the adjustment actuator dynamically varies a distance of the first nozzle from the end-piece during the common pass to create air pockets within the additive material between the multiple filaments; and control the print system to move the end-piece between the first nozzle and the compressor unit configured to compress the additive material to alter a characteristic of the additive material.

19. The additive manufacturing system of claim 18, wherein the articulation system further comprises:

an actuator assembly;

a base operably coupled with the actuator assembly; and an arm rotatable relative to the base, wherein the end-piece defines a form, and wherein the end-piece is operably coupled with a distal end portion of the arm.

20. The additive manufacturing system of claim 19, wherein the additive material includes biodegradable or bio-derived content.

21. The additive manufacturing system of claim 20, wherein the additive material is a polyhydroxyalkanoate (PHA), polyhydroxybutyrate (PHBV), poly(3-hydroxybutyrate-4-hydroxybutyrate) (P3HB4HB), or a blend thereof.

22. The additive manufacturing system of claim 18, wherein the multiple filaments of the additive material are disposed on one another during a common pass of the end-piece along the first nozzle to define gaps between the multiple filaments of the additive material.

23. The additive manufacturing system of claim 18, wherein the print system further comprises:

a blower configured to blow the additive material toward a defined location.

24. The additive manufacturing system of claim 23, wherein the print system further comprises:

a second nozzle having a plurality of orifices, wherein the first nozzle and the second nozzle are directed towards a common defined location.

25. The additive manufacturing system of claim 23, wherein the compressor unit is a weighted rod with a pad at a distal end portion.

26. The additive manufacturing system of claim 25, wherein the compressor unit further comprises a temperature device configured to alter a temperature of the distal end portion of the weighted rod.

* * * * *